US008625012B2

(12) United States Patent
Yuan et al.

(10) Patent No.: US 8,625,012 B2
(45) Date of Patent: Jan. 7, 2014

(54) APPARATUS AND METHOD FOR IMPROVING DYNAMIC RANGE AND LINEARITY OF CMOS IMAGE SENSOR

(75) Inventors: Jie Yuan, Hong Kong (CN); Ho Yeung Chan, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 306 days.

(21) Appl. No.: 12/697,061

(22) Filed: Jan. 29, 2010

(65) Prior Publication Data
US 2010/0194956 A1 Aug. 5, 2010

Related U.S. Application Data

(60) Provisional application No. 61/202,196, filed on Feb. 5, 2009.

(51) Int. Cl.
*H04N 3/14* (2006.01)
*H04N 5/335* (2011.01)
*H01L 27/00* (2006.01)

(52) U.S. Cl.
USPC .......... 348/296; 348/297; 348/308; 250/208.1

(58) Field of Classification Search
USPC ........ 348/294, 296, 297, 302, 308; 250/208.1
See application file for complete search history.

(56) References Cited

U.S. PATENT DOCUMENTS

| | | | |
|---|---|---|---|
| 5,272,535 A | 12/1993 | Elabd | |
| 6,069,377 A * | 5/2000 | Prentice et al. | 257/292 |
| 6,175,383 B1 | 1/2001 | Yadid-Pecht et al. | |
| 6,355,965 B1 * | 3/2002 | He et al. | 257/431 |
| 6,570,617 B2 | 5/2003 | Fossum et al. | |
| 6,606,122 B1 | 8/2003 | Shaw et al. | |
| 6,678,039 B2 * | 1/2004 | Charbon | 356/5.01 |
| 6,741,198 B2 | 5/2004 | McIlrath | |
| 6,927,796 B2 | 8/2005 | Liu et al. | |

(Continued)

OTHER PUBLICATIONS

Chan et al., "A low-distortion and wide dynamic range CMOS imager for wireless capsule endoscopy," IEEE International Symposium on Circuits and Systems 2008 (ISCAS 2008), 2945-2948 (May 8-21, 2008).

(Continued)

*Primary Examiner* — Daniel M Pasiewicz
(74) *Attorney, Agent, or Firm* — Leydig, Voit & Mayer, Ltd.

(57) ABSTRACT

Described herein is a circuit and related method for improving the dynamic range and the linearity characteristic of a CMOS image sensor. In various embodiments of the CMOS image sensor, a current sampler, a comparator, and a 1-bit memory are incorporated in each pixel circuit. In the image sensor, pixels are arranged in columns and a column slice is used to read the digital and analog singles from each column. In addition, a calibration circuit is incorporated in the sensor circuit for providing calibration current, which is used to generate calibration parameter. The image sensor operates in three non-overlapping modes: the difference mode, the WDR mode, and the calibration mode. The image sensor is switched among the three modes by control signals, which are provided to the image sensor by various control circuits. The image sensor normally operates in the difference mode and switches to the WDR mode when the difference between consecutive frames is over a threshold. The calibration mode allows the image sensor generate calibration parameters which are used to improve the linearity of the sensor through a interpolation method.

10 Claims, 18 Drawing Sheets

(56) References Cited

U.S. PATENT DOCUMENTS

| | | | |
|---|---|---|---|
| 6,963,370 B2* | 11/2005 | DiCarlo et al. | 348/297 |
| 6,975,355 B1 | 12/2005 | Yang et al. | |
| 7,202,463 B1* | 4/2007 | Cox | 250/214 R |
| 7,397,509 B2 | 7/2008 | Krymski | |
| 7,443,427 B2 | 10/2008 | Takayanagi | |
| 7,804,537 B2* | 9/2010 | Storm et al. | 348/302 |
| 7,990,451 B2* | 8/2011 | Belenky et al. | 348/297 |
| 8,144,228 B2* | 3/2012 | Gelfand | 348/308 |
| 2002/0024605 A1* | 2/2002 | Merrill et al. | 348/296 |
| 2003/0112351 A1* | 6/2003 | Clark | 348/307 |
| 2006/0027730 A1* | 2/2006 | Bamji et al. | 250/208.1 |
| 2007/0132867 A1* | 6/2007 | Rhee et al. | 348/302 |
| 2008/0001736 A1 | 1/2008 | Steadman et al. | |
| 2008/0036888 A1 | 2/2008 | Sugawa et al. | |

OTHER PUBLICATIONS

State Intellectual Property Office of the People'S Republic of China, International Search Report in International Patent Application No. PCT/CN2008/000313 (May 15, 2008).

Yuan et al., "Digital calibration technique for highly linear wide dynamic range CMOS imaging sensor," Electronics Letters, 45 (9): 449-451 (Apr. 23, 2009).

Yuan et al., "An activity-triggered 95.3 dB DR 75.6 dB THD CMOS imaging sensor with digital calibration," IEEE journal of Solid-State Circuits, 44 (10): 2834-2843 (Oct. 2009).

Snoeij et al., "A CMOS Imager with Column-Level ADC Using Dynamic Column Fixed-Pattern Noise Reduction," *IEEE J. of Solid-State Circuits*, vol. 41, No. 12, Dec. 2006.

Wang et al., "Design and Implementation of a Switched-Current Memory Cell for Low-Power and Weak-Current Operations," *IEEE J. of Solid-State Circuits*, vol. 26, No. 2, Feb. 2001.

Yoshihara et al., "A 1/1.8-inch 6.4 MPixel 60 frames/s CMOS Image Sensor with Seamless Mode Change," *IEEE J. of Solid-State Circuits*, Vo. 41, No. 12, Dec. 2006.

Yuan et al, "Power Analysis and Design of Wide Dynamic Range CMOS Imaging Sensors," *Microelectronics Journal*, vol. 41, pp. 585-593, Sep. 2010.

Gamal et al., "CMOS Image Sensors," *IEEE Circuits & Devices Magazine*, pp. 6-20, May/Jun. 2005.

\* cited by examiner

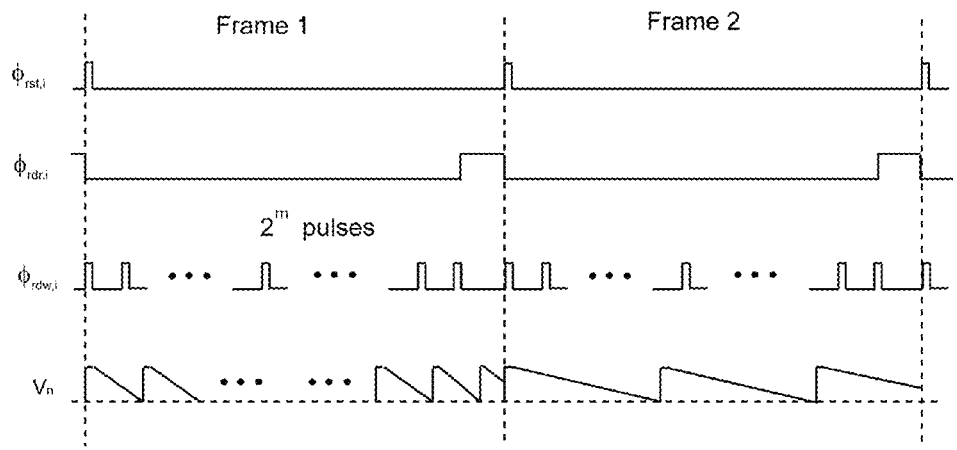
FIG. 6
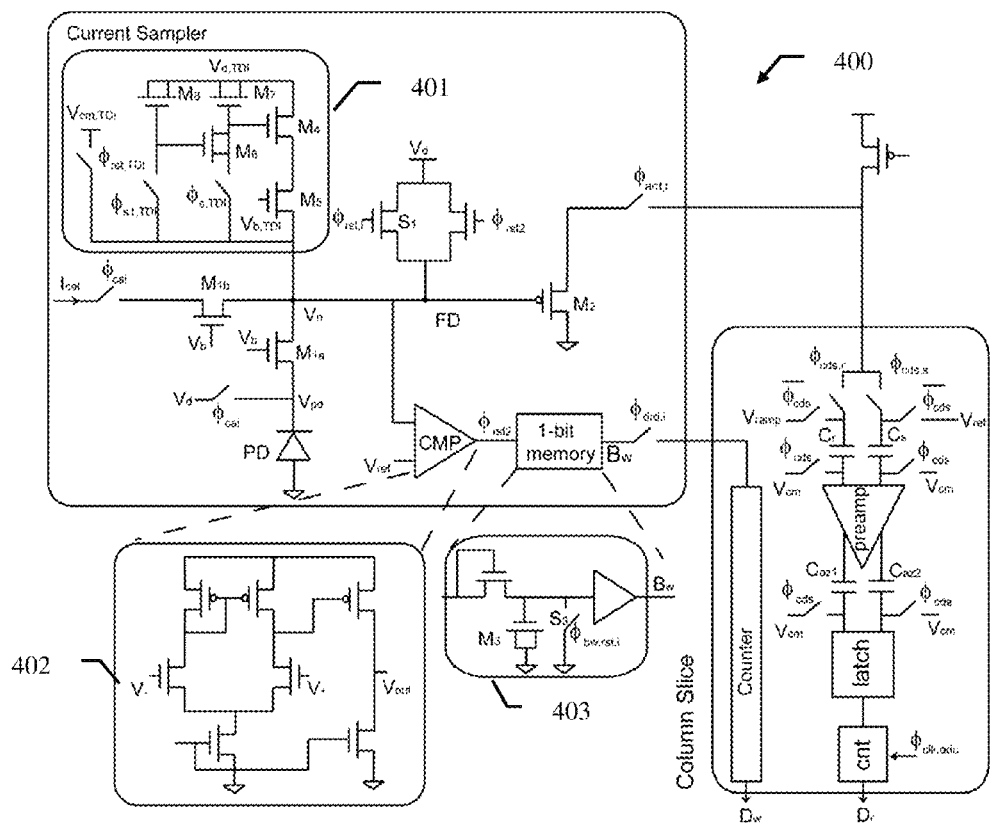

FIG. 7A
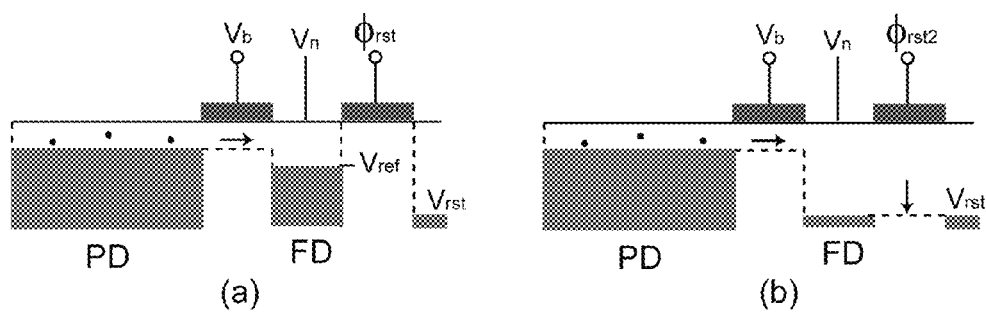
FIG. 7B
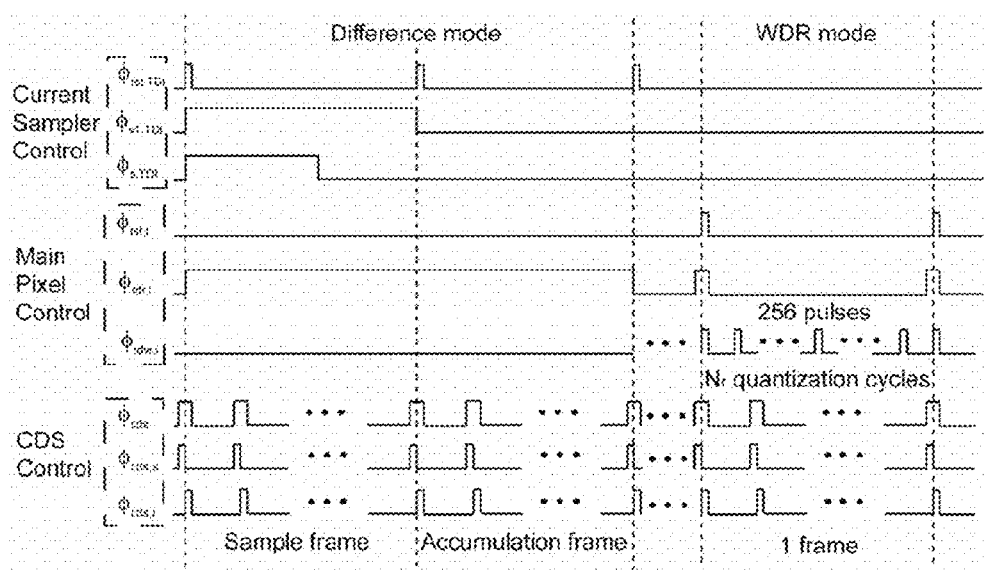
FIG. 7C

APPARATUS AND METHOD FOR IMPROVING DYNAMIC RANGE AND LINEARITY OF CMOS IMAGE SENSOR

CROSS REFERENCE TO RELATED APPLICATION

This patent application claims the benefit of U.S. Provisional Patent Application No. 61/202,196, filed Feb. 5, 2009, which is incorporated by reference in its entirety.

TECHNICAL FIELD

The present invention relates in general to semiconductor image sensing and in particular to a new CMOS image sensing architecture with calibration and activity detection to achieve wide dynamic range, large signal-to-noise ratio, high linearity, low fixed-pattern noise, high fill factor, and low output data rate.

BACKGROUND OF THE INVENTION

Definition of Terms

Fill factor: the fill factor of a CMOS image sensor indicates the size of the light sensitive photodiode relative to the surface of the pixel.

Introduction

The continuous improvement of complementary metal-oxide-semiconductor (CMOS) imaging sensors in recent years has opened up new application areas in scientific research and bio-medical diagnostics, such as space telescope, DNA microarray, bioluminescence detection, and computed tomography. An imaging sensor serves as a data acquisition system in these applications, which require wide dynamic range (WDR) and high linearity over the full range. Charge-coupled devices (CCD) have been mainly used for these applications. However, powerful on-chip processing capabilities make CMOS imaging sensors more attractive than CCD sensors.

Compared to CCD, CMOS image sensor is able to process images on the same chip so that it offers more imaging functionality and provides better performance, while the cost of a CMOS image sensor is considerably lower. An exemplary teaching can be found in U.S. Pat. No. 6,570,617, titled "CMOS active pixel sensor type imaging system on a chip," issued to Fossum of La Crescenta, Calif., and assigned to California Institute of Technology, Pasadena, Calif., May 2003.

A common single-chip CMOS image sensor design includes a regular array of pixel circuits, column-wise processing circuits and a digital parallel-to-serial conversion circuit. The pixel circuit includes a photodiode and pixel-level processing circuits, which can sense and process the light signal. The column-wise processing circuits periodically read out the accumulated photo voltages of all pixels in the column and quantize them into digital values. The parallel-to-serial conversion circuit shifts digital values from all columns off the chip sequentially. An exemplary teaching of a single-chip CMOS image sensor design can be found in "A 1/1.8-inch 6.4 MPixel 60 frames/s CMOS image sensor with seamless mode change," IEEE Journal of Solid-State Circuits, pp. 2998-3006, December 2006 by S. Yoshihara et al.

The pixel circuit of a conventional CMOS active pixel sensor (APS) is shown in FIG. 1. After the shutter signal resets shutter transistor 101, the photocurrent ($I_{ph}$) discharges the capacitance ($C_{int}$) at the floating drain ($V_n$). The accumulated photo voltage ($V_{ph}$) after integration duration ($T_{int}$) is read out. $V_{ph}$ is directly proportional to the photocurrent level, and can be expressed as $$V_{ph} = \frac{T_{int}}{C_{int}} I_{ph}.$$

The largest $V_{ph}$ that a pixel can handle defines the maximal photocurrent that the pixel can process. If $T_{int}$ and $C_{int}$ remain constant, the maximal $V_{ph}$ is limited by the well capacity, which defines the amount an individual pixel can hold before saturating. The well capacity ($V_w$) in the CMOS pixel is the voltage space between the pixel reset voltage and the lowest float drain voltage.

One of the major application areas for CMOS image sensors is wide dynamic range (WDR) sensing. An exemplary teaching on dynamic range can be found in "CMOS image sensors," IEEE Circuits and Devices Magazine, pp. 6-20, May/June 2005 by A. Gamal.

One group of WDR CMOS image sensor designs expands the DR by compressing the photo voltage logarithmically using a MOS transistor in weak inversion. An exemplary teaching can be found in U.S. Pat. No. 7,443,427, titled "Wide dynamic range linear-and-log active pixel," issued to Takayanagi of Tokyo, JP, and assigned to Micro Technology Inc., Boise, Id., October 2008.

Another major group of WDR CMOS image sensor designs scales the integration time for different photocurrent levels. For large photocurrents, shorter integration time is used. For small photocurrents, longer integration time is used. As a result, the photo voltage can be confined within the well capacity. In implementations, the photocurrent is often integrated with multiple durations. The maximal non-saturated photo voltage and its integration time provide the digitized value of the WDR photocurrent. This method is also called multiple sampling. Exemplary teachings can be found in U.S. Pat. No. 6,175,383, titled "Method and apparatus of high dynamic range image sensor with individual pixel reset," issued to Yadid-Pecht of Arcadia, Calif., and assigned to California Institute of Technology, Pasadena, Calif., January 2001, in U.S. Pat. No. 6,975,355, titled "Multiple sampling via a time-indexed method to achieve wide dynamic range," issued to Yang of Mountain View, Calif., and assigned to Pixim Inc., Mountain View, Calif., December 2005, and in U.S. Pat. No. 7,397,509, titled "High dynamic range imager with a rolling shutter," issued to Krymski of La Crescenta, Calif., and assigned to Micron Technology Inc., Boise, Id., July 2008.

Another major group of WDR CMOS image sensor designs scales the integration capacitor for different photocurrent levels. For large photocurrents, larger integration capacitance is used. For small photocurrents, smaller integration capacitance is used. As a result, the photo voltage can also be confined within the well capacity. Exemplary teachings can be found in U.S. Pat. Appl. No. US2008/0036888, titled "Optical sensor and solid-state imaging device," issued to Sugawa et al. of Miyagi, JP, and assigned to Tohoku University, February 2008, and in U.S. Pat. Appl. No. US2008/0001736, titled "Electronic Circuit," issued to Steadman et al. of Aachen, Del., and assigned to Koninklijke Philips Electronics N.V., Eindhoven, NL, January 2008.

Still another major group of WDR CMOS image sensor designs expands the equivalent well capacity by self-resetting the pixel. The pixel includes an internal shutter, which is controlled by a comparator. The comparator compares the float drain (FD) voltage ($V_n$) to a threshold voltage ($V_{ref}$). If $V_n$ falls below $V_{ref}$, the output of the comparator resets the pixel. The temporal course of the FD voltage of a self-reset pixel is plotted in FIG. 2. The self-reset activity is proportional to the photocurrent intensity. A self-reset pixel can be treated as a continuous-time $1^{st}$-order $\Sigma\Delta$ analog-to-digital converter (ADC). By including a fast digital processor and storage cell for each photodiode, the CMOS image sensor is able to achieve WDR. An exemplary teaching can be found in U.S. Pat. No. 6,741,198, titled "High resolution, low power, wide dynamic range imager with embedded pixel processor and DRAM storage," issued to McIlrath of Lexington, Mass., and assigned to R3 Logic, Inc., Somerville, Mass., May 2004. The digital pixel sensor (DPS) design developed a self-reset pixel including a pixel-level ADC. The ADC quickly reads out the FD voltage periodically. A column-level processor is designed to process the digitized voltages to estimate the photocurrent level. An exemplary teaching can be found in U.S. Pat. No. 6,927,796, titled "CMOS image sensor system with self-reset digital pixel architecture for improving SNR and dynamic range," issued to Liu et al. of Palo Alto, Calif., and assigned to the Board of Trustees of the Leland Stanford Junior University, Stanford, Calif., August 2005.

Although the aforementioned CMOS image sensor designs provide WDR, images from these sensors have performance deficiencies. The logarithmic WDR CIS has low linearity and high noise. The scaling methods have limited linearity over the whole DR. The time scaling methods also have low signal-to-noise ratio (SNR). The pixel-level $\Sigma\Delta$ scheme includes high-speed digital circuits in the analog pixel, which reduces the sensor fill factor and injects digital noise into the analog pixel. The linearity of the DPS scheme is low as well. For a self-reset pixel, the effective reset threshold voltage is actually dependent on the photocurrent level due to the comparator offset and the comparator delay. FIG. 3 shows the simulated well capacity ($V_w$) against photocurrent, which is highly nonlinear. Without compensating this nonlinearity, the linearity of the image senor design is low. The total-harmonic distortion (THD) is around −40 dB. The self-reset pixels also have high fixed-pattern noise (FPN) because of the mismatch in pixel circuits.

In summary, a common problem for existing WDR CMOS image sensor designs is their low linearity. An image senor converts light intensity into digital values. The linearity describes the fidelity of this conversion. For applications such as medical diagnostics, biological characterization, scientific research and space missions, the captured light intensity is used as indication of the amount of certain substance or tissues. Hence, it requires high linearity, as well as wide dynamic range, from the imaging system. Also, WDR CMOS image sensors normally generate digital image data at very high data rate. It is desirable to reduce the data rate for implantable medical diagnostics, surveillance and sensory imaging applications.

BRIEF SUMMARY OF THE INVENTION

Described herein is a CMOS image sensor circuit and related method that provide wide dynamic range, high linearity, high signal-to-noise ratio, low fixed-pattern noise, and high fill factor. The CMOS image sensor circuit described herein also has the advantage of reduced data rate.

According to one embodiment, the CMOS image sensor circuit utilizes a self-reset pixel approach to expand the dynamic range. The sensor circuit includes a partial-quantization architecture with a new self-reset pixel design and new column processing circuits. In the embodiment, digital circuits are separated from the analog pixel completely so that WDR image information can be read out efficiently without digital noise coupling into the analog pixel. The fill factor of the CMOS image sensor is improved.

According to another embodiment, an interpolation-based digital calibration method is used to compensate the nonlinear $V_w$ of the self-reset pixel, thereby improving the linearity of the image sensor and reducing the fixed-pattern noise. The sensor circuit includes calibration circuits in each self-reset pixel, corresponding column-level calibration circuits, a reference current analog-to-digital converter, and a decoder.

According to still another embodiment, the CMOS image sensor utilizes activity-triggering to reduce the output data rate. Temporal difference circuits are incorporated in each pixel. During the normal operation, the image sensor generates a difference image at low data rate. When pixels in the difference image exceed a threshold, indicating heavy activities or substantial motions in the scene, the CMOS image sensor switches to capture high quality WDR images.

In a further embodiment, a partial quantization scheme is implemented in the pixel circuit, which linearly expands the imaging sensor dynamic range (DR) to 95.3 dB. The linearity of the partial quantization scheme over the wide DR is improved using a digital calibration method with a back-end digital signal processor (DSP). The pixel distortion after calibration reaches −75.6 dB. The partial quantization pixel also achieves high signal-to-noise ratio (SNR). The fill factor of the new pixel is 27%.

In still further embodiment, an imaging apparatus having a wide dynamic range, improved linearity, and low output data rate is provided. The imaging apparatus includes a pixel array having a first working mode for generating calibration data, a second working mode for measuring a difference between consecutive frames, and a third working mode for generating pixel signals having a dynamic range larger than the dynamic range of the first and second modes. The imaging apparatus further includes a control circuit for generating control signals for switching the pixel array among the first, second, and third working modes, and a processor for generating output signals in accordance with the pixel signals and the calibration data so that a linearity characteristic of the pixel signals is improved.

In an alternative embodiment, a pixel circuit for generating analog and digital pixel signals is provided. The pixel circuit includes (a) a photodiode for generating a photocurrent in response to incident light; (b) a float drain for integrating the photocurrent; (c) a first cascode transistor coupled between the photodiode and the float drain for passing the photocurrent; (d) an external shutter transistor coupled between the float drain and a supply voltage for providing an external shutter signal to reset the float drain; (e) an internal shutter transistor for resetting the float drain in response to one or more self-reset event; (f) a comparator for comparing a voltage of the float drain and a reference voltage and generating a pulse indicative each of the one or more self-reset events in response to the comparison; (g) a memory for recording the pulse; (h) an analog buffer for receiving the analog pixel signal from the float drain and for transmitting the analog pixel signal through an analog column bus; (i) a digital buffer for receiving the digital pixel signal from the memory and for transmitting the digital pixel signal through a digital column bus; (j) a second cascode transistor coupled to the float drain for passing a calibration current; (k) a first switch coupled between the photodiode and the supply voltage and controlled by a calibration signal; (l) a second switch coupled between a calibration current input terminal and the second cascode transistor and controlled by the calibration signal; and (m) a current sampler coupled to the float drain for sampling the photocurrent.

In still an alternative embodiment, a partial quantization circuit for extending a dynamic range of a CMOS image sensor is provided. The circuit comprises: (a) a pixel array including a plurality of pixels arranged in one or more columns, wherein each pixel of the pixel array integrates a photocurrent, performs a self-reset, and generates a pulse in response to the self-reset; (b) one or more analog column buses, each coupled to one of the one or more columns for receiving a residual pixel voltage from the associated column; (c) one or more digital column buses, each coupled to one of the one or more columns for receiving the pulses from the associated column; (d) one or more digital column counter, each coupled to one of the one or more digital column buses for counting the number of the pulses collected from the associated column; (e) one or more analog-to-digital converters (ADCs), each coupled to one of the one or more analog column buses for quantizing the residual pixel voltage from the associated column at the end of an integration; and (f) a processor for calculating a photo voltage using the number of the pulses, the quantized residual pixel voltage, and a well capacity so that the dynamic range of the photo voltage is extended.

In still an alternative embodiment, a partial quantization method is provided for improving a dynamic range and a signal-to-noise ratio of a CMOS image sensor. The method comprises: (a) generating a photocurrent in response to incident light; (b) generating a pixel voltage by integrating the photocurrent; (c) continuously comparing the pixel voltage to a reference voltage during the integration; (d) generating a pulse in response to a result of (c); (e) resetting the pixel voltage to a reset voltage; (d) calculating a pixel well capacity by taking a difference between the reference voltage and the reset voltage; (f) counting the number of pulses during the integration; (g) generating a residual pixel voltage by sampling and quantizing the pixel voltage at the end of the integration; (h) multiplying the number of pulses by the pixel well capacity; and (i) calculating a digitized photo voltage by adding the residual pixel voltage to the product of the number of pulses and the pixel well capacity.

In still an alternatively embodiment, a circuit is provided for improving the linearity of a CMOS image sensor. The circuit comprises: (a) a pixel array including a plurality of pixels, each pixel having a calibration mode, a difference mode, and a wide dynamic range mode, and each pixel further including a calibration circuit for switching the photodiode off and integrating a calibration current; (b) a calibration current array for generating a plurality of calibration currents for the calibration mode; (c) a reference analog-to-digital converter for quantizing the calibration currents in the calibration mode for generating calibration parameters; and (d) a decoder for processing calibration data and raw quantized data for calculating image data during the wide dynamic range mode so that the linearity of the image data is improved.

In still an alternative embodiment, an interpolation-based calibration method is provided for improving the linearity and reducing the fixed-pattern noise of a CMOS image sensor having a partial quantization architecture, wherein the CMOS image sensor includes an array of pixels. The method includes: (a) generating a photocurrent in each pixel in response to incident light; (b) digitizing a least-significant bit (LSB) size of a quantizing analog-to-digital converter (ADC) of the image sensor by a reference ADC; (c) taking a plurality of samples of a well capacity of each pixel of the image sensor; (d) calculating an interpolated well capacity for each pixel by interpolating the samples; (e) multiplying a self-reset number by the linear well capacity; and (f) calculating an accumulated photo voltage by adding a residual pixel voltage and the product of generated in (e).

BRIEF DESCRIPTION OF THE SEVERAL VIEWS OF THE DRAWINGS

FIG. 6 illustrates the timing of control signals of a pixel in the wide dynamic range mode;

FIG. 7A depicts another embodiment of the pixel circuit having an linearly expanded WDR;

FIG. 7B illustrates the potential diagram of the pixel circuit in the WDR mode;

FIG. 7C illustrates the timing diagram of the difference mode and the WDR mode;

DETAILED DESCRIPTION OF THE INVENTION

WDR Pixel Design

The dynamic range (DR) of a pixel is limited by the well capacity as specified by $$DR = \frac{V_w C_{int}/T_{int}}{I_{min}}, \quad (1)$$

where $I_{min}$ is the minimum photo current that the sensor can detect. This is determined by the least significant bit (LSB)

size of the quantizer or the pixel read-out noise level, whichever is larger. The maximum SNR of this pixel is $$SNR = \frac{V_w^2}{\frac{qV_w}{C_{int}} + \sigma_{rd}^2}, \quad (2)$$

where $\sigma_{rd}^2$ is the input-referred read-out voltage noise power.

Figure 1:
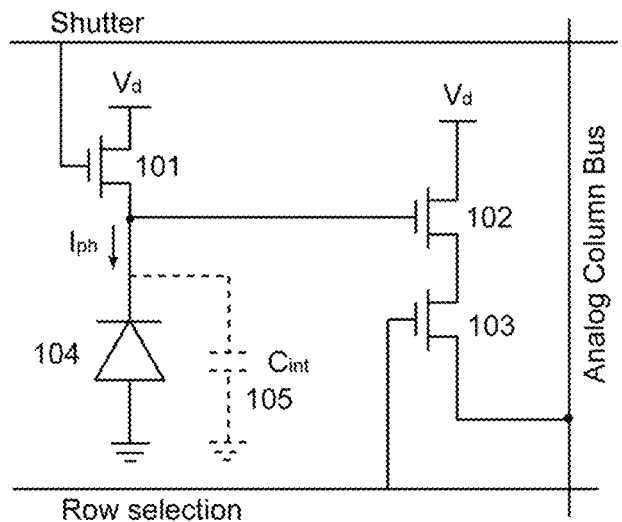
FIG. 1 depicts the diagram of a conventional three-transistor active pixel sensor.
Figure 2:
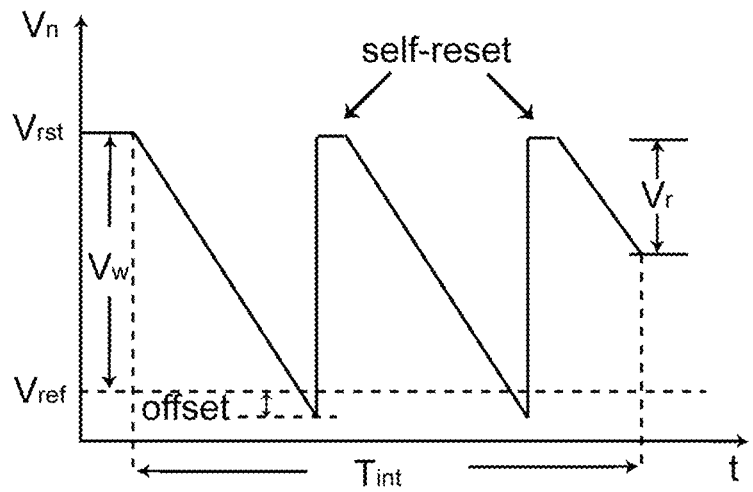
FIG. 2 depicts the pixel dynamics of a pixel with self-reset capability.
Figure 3:
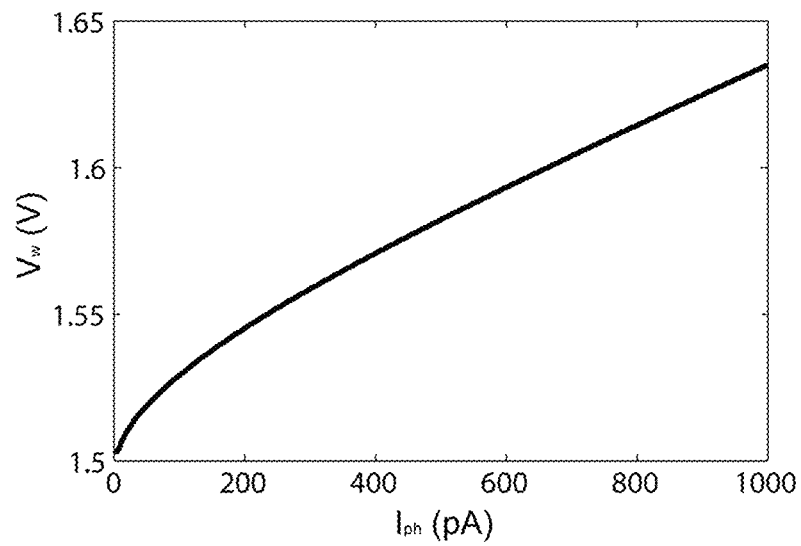
FIG. 3 illustrates the nonlinear relationship between the well capacity and the photocurrent of a pixel.
Figure 4A:
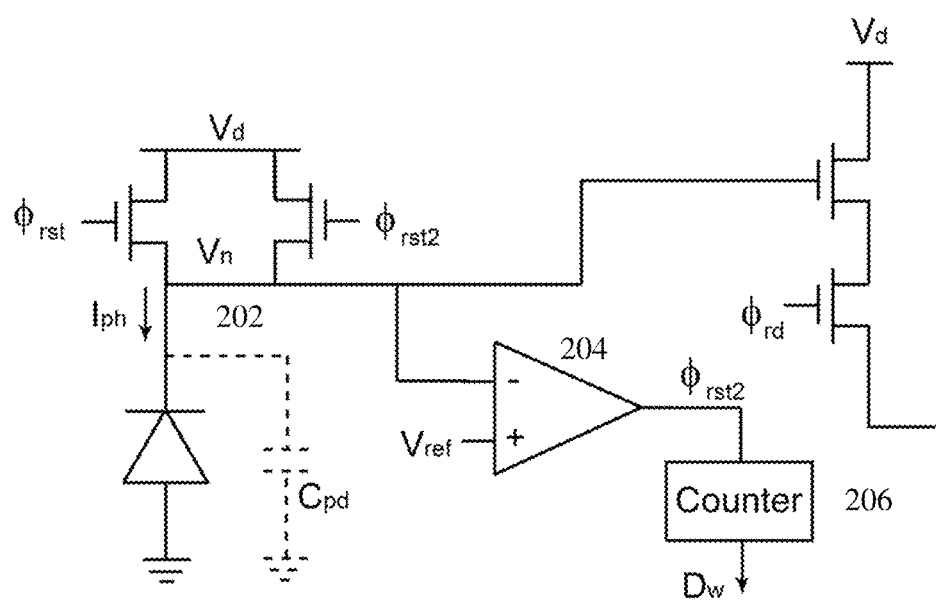
FIG. 4A depicts the diagram of one embodiment of the pixel circuit having an linearly expanded WDR.

In order to design a highly linear WDR imaging sensor with high SNR, the dynamic range (DR) should be expanded linearly. In one embodiment, the DR is linearly expanded by adding a comparator 204 and a counter 206 into the pixel circuit as shown in FIG. 4A. The photo diode gets reset whenever $V_n$ falls below the threshold voltage, as shown in FIG. 2. The number of pixel overflow events ($D_w$) is recorded by the counter 206. The equivalent well size in this pixel is $V_{rst}-V_{ref}$. At the end of the accumulation, the accumulated photo voltage can be simply calculated as $$V_{ph} = D_w \cdot V_w + D_r \cdot LSB_0 \quad (3)$$

where $LSB_0$ is the LSB of the quantizer, while $D_r$ is the quantized residual voltage ($V_r$). Because $V_w$ is nonlinearly dependent on the photocurrent as shown in FIG. 3, the photo voltage $V_{ph}$ obtained above is low. The embodiments detailed below provide calibration circuits and methods to compensate for the nonlinearity.

Circuit Description

Figure 4B:
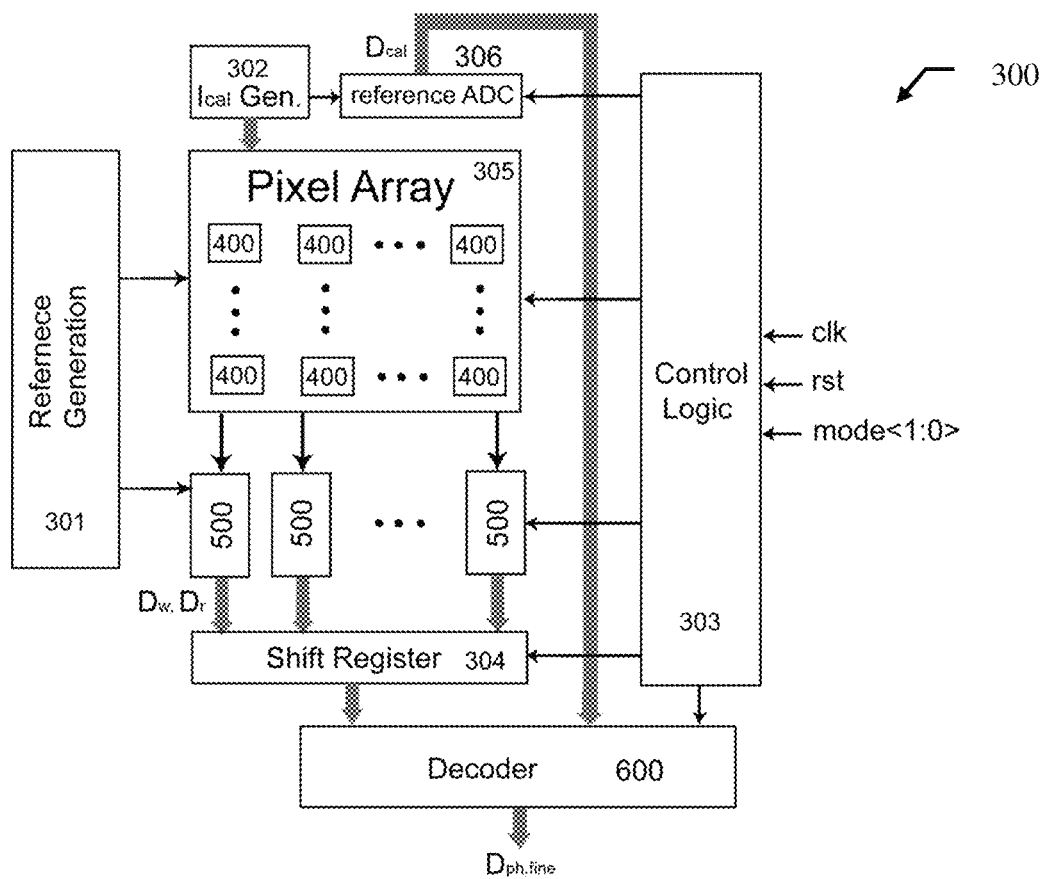
FIG. 4B depicts the block diagram of an CMOS image sensor having three operation modes: the difference mode, the WDR mode, and the calibration mode.

In one embodiment, the imaging sensor is designed in a 0.35 μm 2P4M CMOS process. The functional block diagram of the designed imaging sensor is shown in FIG. 4B. Pixels 400 in pixel array 305 are organized in $N_r$ rows and $N_c$ columns. Outputs of pixels 400 in each column are processed by a column circuit 500 associated with the column. Parallel digital outputs of $N_c$ column circuits 500 are multiplexed by a shift register 304. The analog reference voltages and currents of pixels 400 and column circuits 500 are generated by reference generation circuit 301. The calibration circuit requires a calibration current generation circuit 302 and a reference ADC 306. The calibration data and raw quantized photocurrent data are processed by decoder 600 for recovering the accurate digital photocurrent. Control signals and clocks of pixel 400, column circuit 500, shift register 304, reference ADC 306 and decoder 600 are generated by control logic 303. The working mode of the circuit is selected by an external digital code (mode<1:0>). Control logic 303 further receives an external clock (clk) and an external reset signal (rst).

A. Pixel Circuit

Figure 5A:
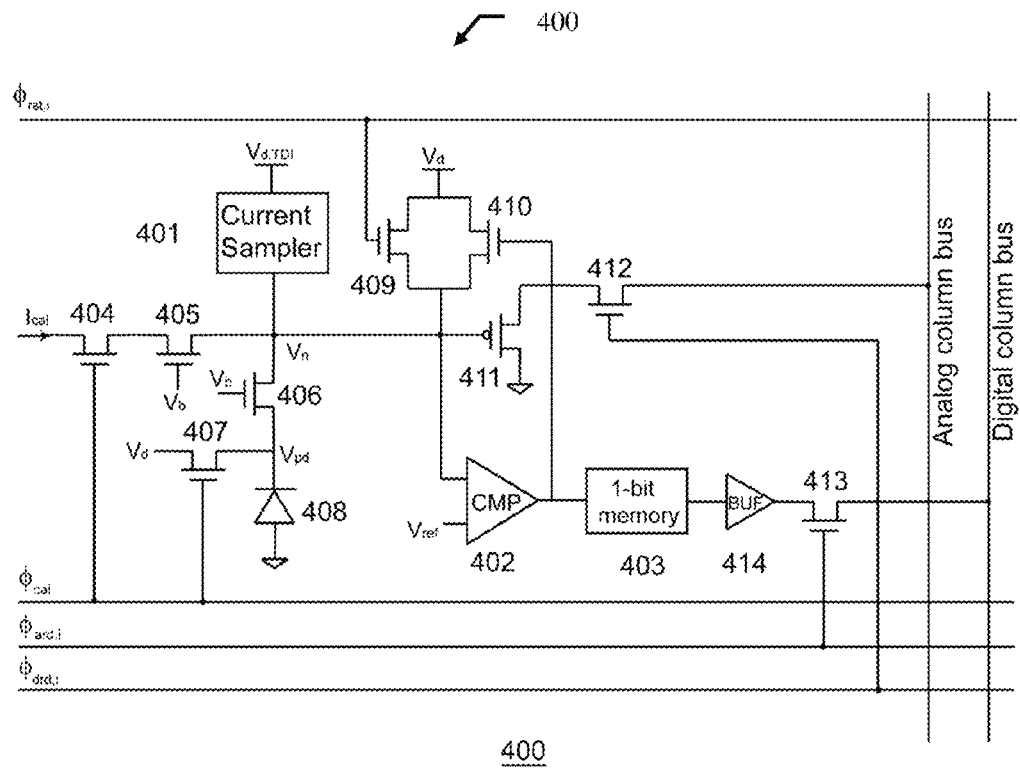
FIG. 5A depicts the diagram of another embodiment of the pixel circuit having an linearly expanded WDR.

According to a further embodiment, the pixel circuit 400 with the column-wise pathway is shown in FIG. 5A. Each pixel circuit 400 includes a basic four-transistor active pixel sensor (4T APS), which includes transistors 406, 409, 411, and 412 and photodiode 408, an in-pixel comparator 402, a one-bit memory 403, a current sampler 401, a buffer 414 and calibration circuits including transistors 404, 405, and 407.

The circuit 400 shown in FIG. 5A can be operated with a global shutter, which means $\phi_{rst,i}$ for all rows are the same. The pixel circuit 400 can also be operated with a rolling shutter, which means $\phi_{rst,i}$ has a phase shift between different rows. The rolling shutter reduces the speed requirement on the circuits with the same frame rate ($f_{frame}$).

Figure 5B:
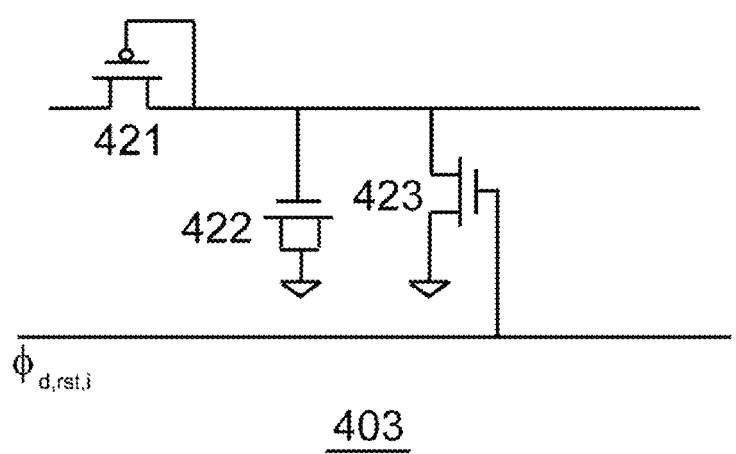
FIG. 5B depicts the circuit diagram of the 1-bit memory 403 shown in FIG. 5A.

The 1-bit memory 403 is further shown in FIG. 5B. The memory is a 1-bit dynamic random-access-memory (DRAM). The data is stored on capacitor 422. Diode 421 enables the pulse to be written into the DRAM asynchronously. Transistor 423 controls the reset of the DRAM by using signal $\phi_{d,rst,i}$. The PMOS diode 421 has strong write capability, while the reset transistor 423 has weak reset capability. Therefore, pulses can be written into the DRAM during the reset period.

The pixel circuit 400 operates in three modes: the difference mode, the WDR mode, and the calibration mode.

When the pixel circuit is in the WDR mode, signal $\phi_{cal}$ is low. Transistors 404 and 407, which act as switches, are turned off. Current sampler 401 is turned off by the control signals. The timing of control signals of pixel 400 in the WDR mode is shown in FIG. 6. The external shutter signal of row i ($\phi_{rst,i}$) turns on external shutter transistor 409 to reset the FD voltage $V_n$ to a reset voltage $V_{rst}$. Photocurrent from photodiode 408 discharges $V_n$. 405 and 406 are identical cascode transistors. Once $V_n$ falls below $V_{ref}$, comparator 402 turns on internal shutter 410 and resets the FD to $V_{rst}$ again. The pulse from comparator 402 is recorded by 1-bit memory 403. Control signal $\phi_{drd,i}$ periodically turns on digital buffer 414 of the digital column bus for column circuit 500. At the end of the integration, control signal $\phi_{ard,i}$ turns on analog buffer 411 of the analog column bus. $V_n$ voltage is read and quantized by column circuit 500. A simple comparator with low biasing current can be used for comparator 402.

When pixel 400 is in the difference mode, current sampler 401 is turned on by the control signals. $V_{ref}$ is biased with a very low voltage so that the self-reset function is shut off. Current sampler 401 samples the photocurrent from photodiode 408 in the sampling frame. In the consecutive accumulation frame, current sampler 401 holds the current of the previous sampling frame. The current difference between consecutive frames is integrated. $V_n$ is read and quantized at the end of this frame, which gives the difference frame and indicates the activity within the scene. An exemplary teaching on the current sampler design can be found in "Design and implementation of a switched-current memory cell for low-power and weak-current operations", IEEE Journal of Solid-State Circuits, Vol. 36, pp. 304-307, February 2001, by C. Wang et al, which is incorporated herein by reference in its entirety and for everything it teaches therein.

When pixel 400 is in the calibration mode, control signal $\phi_{cal}$ is high and current sampler 401 is turned off. Photodiode 408 is disconnected from $V_n$. Instead the calibration current $I_{cal}$ is integrated in the pixel.

The three operating modes are described in greater detailed below with reference to FIG. 7A, which depicts further details of the pixel circuit 400.

1) Difference Mode

The pixel circuit 400 normally runs in the difference mode to reduce the output data rate, which saves data transmission power and the digital power of following processing circuits. In the difference mode, the current sampler 401 in each pixel circuit is active. $V_{ref}$ of the comparator 402 is set to a low value, which keeps the comparator output low. The difference mode runs through every two consecutive frames and a difference image is calculated from the two consecutive frames.

At the beginning of the sampling frame, both sampling switches stay on. $\phi_{s,TDI}$ turns off early, which injects charge only onto the capacitor M6. At the end of the frame, $\phi_{s1,TDI}$ turns off, and injects most charge onto M8 which is about 5 times larger than M6. The designed sampler 401 can sample the photo current with offset less than 0.1%, which is enough for activity detection in most applications.

In an accumulation frame, the difference current between the new photo current and the sampled current accumulates on the floating drain ($V_n$) after the difference shutter ($\phi_{rst,TDI}$) turns off. The reset level $V_{cm,TDI}$ is in the middle of the voltage range so that both positive and negative difference currents can be accumulated. At the end of the frame, the accumulated voltage is quantized by the column-wise ADC.

An off-chip DSP checks the difference image, which indicates the activity in the scene. If the activity is beyond a certain level, the imaging sensor 300 is switched to the WDR mode to capture a high-quality image. The current sampler 401 is switched off during the WDR mode. The supply voltage of the sampler ($V_{d,TDI}$) is 0.4V lower than $V_d$ to suppress the leakage current from the sampler.

2) WDR Mode

To avoid image lag in the 4T APS pixel, the transfer gate M1a never resets during the accumulation. Instead, $V_b$ stays fixed so that the potential well of the diode is always full in the steady state, as shown in FIG. 7A. The photo charge spills over to the floating drain during the accumulation.

The WDR mode starts as a rolling shutter ($\phi_{rst,i}$) resets the pixel. When the accumulated voltage on the floating drain ($V_n$) reaches the threshold voltage $V_{ref}$ of the comparator, the output of the comparator ($\phi_{rst2}$) resets the floating drain, as shown in FIG. 7B. Then, the photo current accumulates on the floating drain again. The dynamic of the floating drain voltage $V_n$ is similar to that shown in FIG. 2. An overflow event is recorded by a MOS capacitor M3 in the 1-bit memory. M3 is regularly read and reset by the column slice to count the overflow number. At the end of the accumulation, the residual voltage $D_r$ of the pixel is read out and quantized by the column-wise ADC.

Correlated double sampling (CDS) is performed on the residual voltage $D_r$. The ADC first samples ($\phi_{cds,s}$) the residual voltage on $C_s$. The pixel is reset before the analog read-out control ($\phi_{ard,i}$) switches to the next row. The pixel reset voltage is sampled on $C_r$. This CDS is performed over two frames. It can effectively remove 1/f reset noise. The quantization takes place after the CDS phase ($\Phi_{cds}$) turns off.

The timing diagram for the difference mode and the WDR mode is shown in FIG. 7C.

With a constant well size $V_w$, the accumulated photo voltage of this partial quantization scheme can be calculated by equation (3). Nonetheless, $V_w$ is nonlinear because the asynchronous reset by the weak-current comparator (1 nA) depends heavily on the photo current. In order to compensate for the nonlinearity, a digital calibration scheme is provided for the sensor circuit 300.

The general operation of the calibration scheme involves sampling the nonlinear $V_w$ function in the calibration mode. In the WDR mode, the accurate well size $V_w$ is interpolated from the sampled nonlinear function, and is used to calculate the accurate photo voltage using equation (3).

3) Calibration Mode

Figure 8:
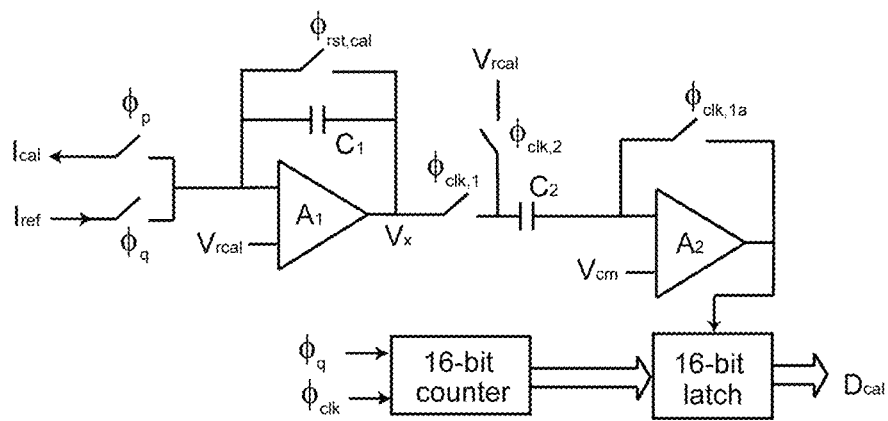
FIG. 8 depicts a 16-bit dual-slope current ADC used to measured the calibration current.

In the calibration mode, the photodiode is switched off. Instead, the pixel accumulates an on-chip calibration current ($I_{cal}$). Identical cascode transistors M1a and M1b keep the same FD capacitance in the calibration mode and the WDR mode. The exact $I_{cal}$ value can be measured from an on-chip 16-bit current ADC, as shown in FIG. 8. With equation (3), the well capacity $V_w$ for current $I_{cal}$ can be calculated, which forms one sample on the nonlinear function in FIG. 3. Twelve on-chip current sources are designed for each column.

The current ADC is a dual-slope ADC. In the pre-charge phase $\phi_p$, $I_{cal}$ charges $C_1$. In the quantization phase $\phi_q$, the reference current $I_{ref}$ discharges $C_1$. $V_x$ is compared with $V_{rcal}$ continuously in $\phi_{clk,2}$ phases. CDS is performed in $\phi_{clk,1}$ phase. The zero crossing moment will be latched by the output of $A_2$, which is proportional to $I_{cal}$. The system clock is 20 MHz. Each $I_{cal}$ quantization takes about 3.2 ms. Measurements of the calibration currents in one column last about 38.4 ms.

In one embodiment of the pixel circuit 400, the pixel area is 25 μm×25 μm. The photodiode size is 17 μm×10 μm, which gives a fill factor of 27%. The current sampler accounts for about 19% of the pixel. Without the current sampler, the fill factor is 33%.

4) Temporal Noise Analysis

With a small photo current which does not trigger an overflow, the pixel temporal noise mainly comes from the photo current shot noise and the read-out circuit noise. The noise power is $$\overline{v_n^2} = \frac{qV_{ph}}{C_{int}} + \overline{\sigma_{rd}^2}. \tag{4}$$

At the low current end, the circuit noise dominates. Therefore, the SNR increases 6 dB per photo current doubling. At the large current end, the photo current shot noise dominates. The SNR increases 3 dB per photo current doubling.

When the photo current is large enough to trigger overflows, the pixel temporal noise mainly comes from the reset noise and the photo current shot noise. The overall noise power is $$\overline{v_n^2} = \frac{qV_{ph}}{C_{int}} + D_w \frac{kT}{C_{int}}, \tag{5}$$

where $D_w$ is the overflow number. The reset noise is much smaller than the shot noise. Therefore, the SNR improves by 3 dB per photo current doubling. The pixel SNR can be simulated and plotted in FIG. 7. In the simulation, the well capacity $V_w$ is 1.5V. The DR is extended by 256 times. The integration capacitance is 12fF. The read out circuit noise is 30e⁻. As the partial quantization scheme extends the DR greatly, the pixel SNR is better than the previous designs.

B. Column-wise Counter

Figure 9:
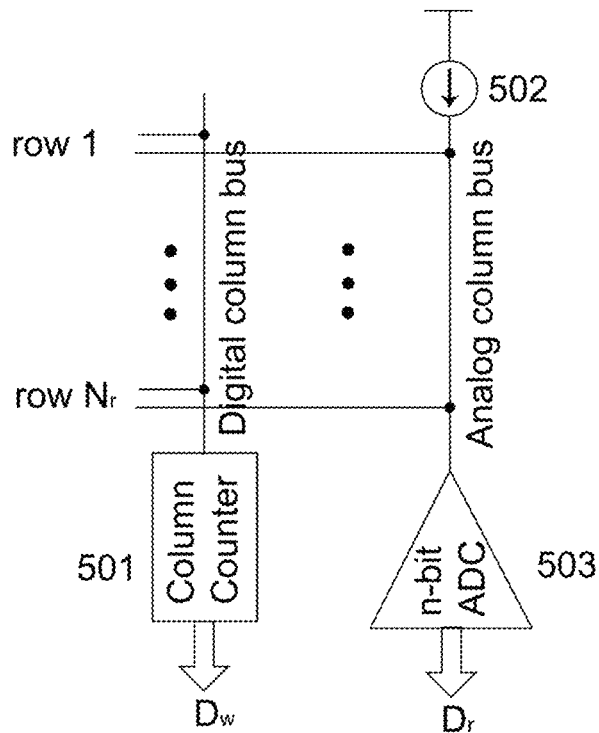
FIG. 9 depicts the diagram of the column circuit 500.

A block diagram of column circuit 500 is shown in FIG. 9. The single-bit data on the digital column bus is periodically processed by column counter 501. Analog buffer 411 in each pixel is driven by column current source 502. The output analog value on the analog column bus is quantized by an n-bit ADC 503 into digital code $D_r$. The resolution of the ADC is generally 8-10 bits. The ADC can be designed from multiple structures. One possibility is a single-slope ADC. An exemplary teaching can be found in "A CMOS imager with column-level ADC using dynamic column fixed-pattern noise reduction," IEEE Journal of Solid-State Circuits, Vol. 41, pp. 3007-3015, December 2006, by M. Snoeij et al, which is hereby incorporated by reference and for everything that it includes.

Figure 10:
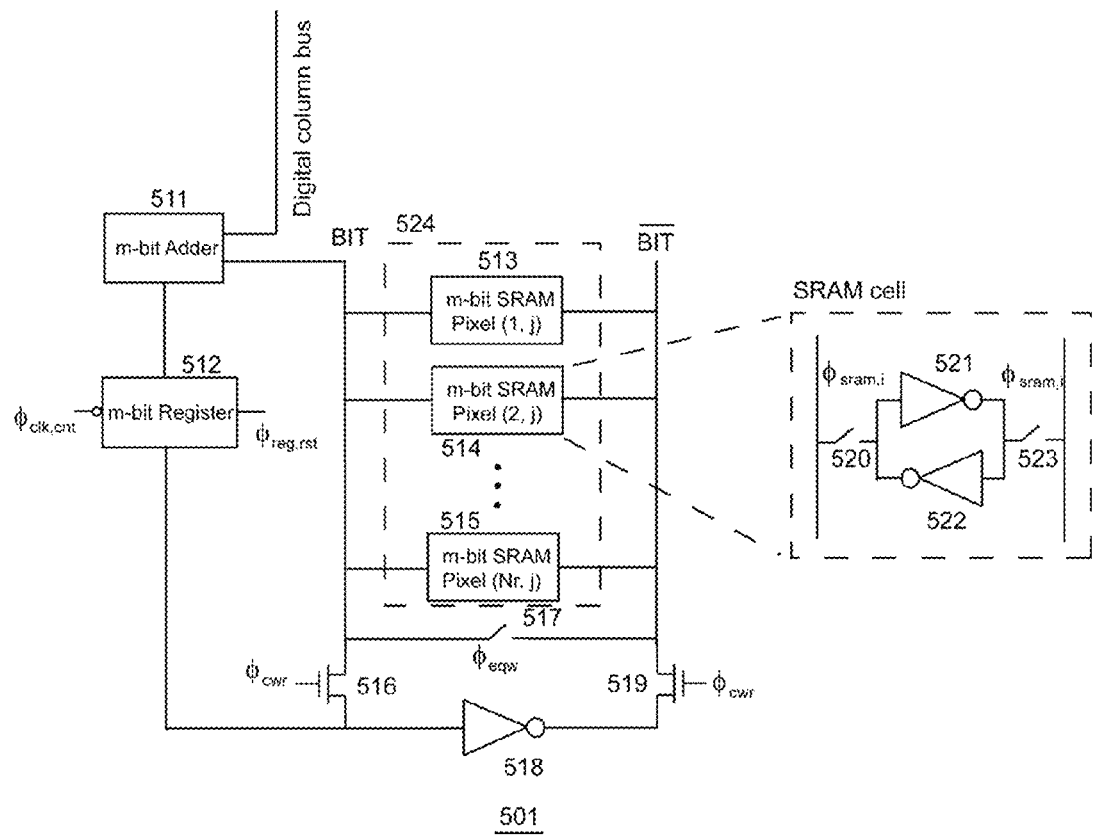
FIG. 10 depicts the diagram of the column counter 501 shown in FIG. 9.
Figure 11:
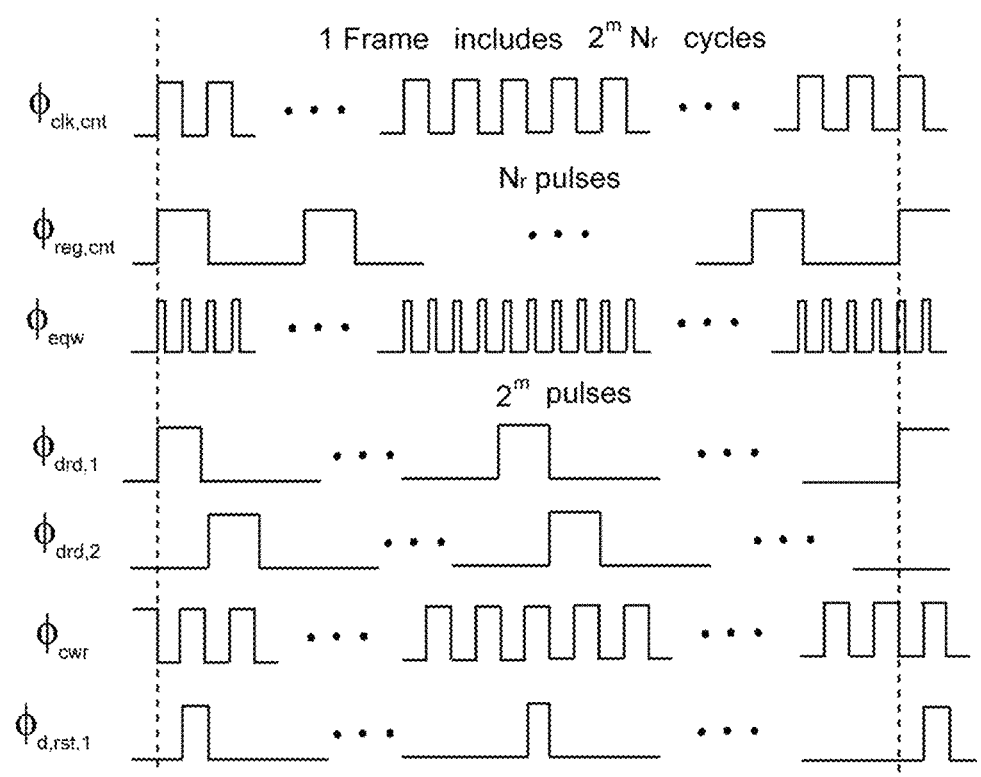
FIG. 11 illustrates the timing of control signals of the column counter 501.

The block diagram of counter 501 for j-th column is shown in FIG. 10. The timing of control signals for counter 501 is shown in FIG. 11. Counter 501 includes an array of static random-access-memory (SRAM). Each SRAM is m-bit long. It holds the self-reset number ($D_w$) of the pixel in one row. The SRAMs of different rows are opened sequentially by control signal $\phi_{sram,i}$. The operation sequence on every SRAM includes a read and a write, which is performed in a counter clock $\phi_{clk,cnt}$ cycle. In the read phase of SRAM (i,j), switch 513 of pixel (i,j) is turned on and connects digital buffer 414 to the digital column bus so that the content of the SRAM adds up with the content of 1-bit memory 403 by adder 511, which gives the new $D_w$ of pixel (i,j). On the $\phi_{clk,cnt}$ falling edge, the new $D_w$ is latched by register 512. As control signal $\phi_{cwr}$ turns on transistors 516 and 519, the new $D_w$ is written into SRAM (i, j). During the write phase of the same SRAM, 1-bit memory 403 in pixel (i, j) is also reset by signal $\phi_{d,rst,i}$. The BIT bus and the $\overline{BIT}$ bus are equalized by control signal $\phi_{eqw}$ before any SRAM cell is opened. The SRAM cells are reset by the control signal $\phi_{reg,rst}$. Depending on the shutter design, the timing of signals can be different. FIG. 11 is the timing diagram for the rolling shutter. During each frame, an m-bit long SRAM needs to be refreshed by $2^m$ times. As a result, the dynamic range of the image sensor is expanded by $2^m$ times with this partial quantization method. The frequency of the counter clock is $2^m \times N_r \times f_{frame}$.

The dynamic range of this partial quantization architecture is m+n bit. With the quantized values $D_w$ and $D_r$, the overall accumulated photo voltage $V_{ph}$ can be calculated as $$V_{ph} = D_w \cdot V_w + D_r \cdot LSB_0,$$

where $LSB_0$ is the least significant bit (LSB) size of ADC 503. Because $V_w$ is nonlinearly dependent on the photocurrent as shown in FIG. 3, the linearity of $V_{ph}$ from the equation above is as low as the other self-reset CMOS image sensors. This nonlinearity is compensated for and eliminated by using the calibration scheme described herein.

In one further embodiment, the pixel DR is expanded by 256 times. As a result, an 8-bit column counter is required by each pixel. A normal 8-bit counter needs 8 D-flip-flops (DFF), which requires about 300 transistors. If this counter is included in the pixel, the fill factor will be low. The digital spikes will contaminate the analog sensor as well.

The column-wise counter includes an SRAM bank for different pixels in the column. The logics add the overflow bit $B_w$ from the pixel to the content of the SRAM periodically. The counter runs on the counter clock $\phi_{clk,cnt}$. The clock rate is $256 \times N_r \times f_{frame}$, where $N_r$ is the row number. At the beginning of each frame of every row, SRAM of this row is reset by $\phi_{eqw}$. The digital read-out control signal $\phi_{drd,i}$ selects both the SRAM and the 1-bit memory of i-th row to perform the addition. After the addition, the falling edge of $\phi_{clk,cnt}$ latches the new overflow number. Then, the column digital write signal $\phi_{dwr}$ controls the new overflow number to be written into the same SRAM. After that, the next row is turned on for refreshing. Within a frame, the SRAM of one pixel will be refreshed by 256 times. The adder and the register should operate at this frequency.

After the addition, the clock $\phi_{bw,rst,i}$ resets the 1-bit memory in the pixel of i-th row. To prevent a write and reset confliction, a weak reset is designed by applying a low gate voltage on the NMOS switch 423. If the comparator 402 generates a high pulse during the reset phase $\phi_{bw,rst,i}$, the NMOS diode 421 is still able to pull up the voltage on transistor 423.

Because the adder is shared by different pixels in the column, the transistor count per pixel can be greatly reduced. On average, 48 transistors are needed for each pixel, which could be further reduced by using dynamic RAM (DRAM). DRAM can be easily implemented in this architecture because the refreshing circuits are already in place.

C. Column-wise ADC

As shown in FIG. 7B, a single-slope ADC is designed to quantize the pixel residual voltages in one column. The ADC design is similar to the one introduced in, M. Snoeij, et al. "A CMOS imager with column-level ADC using dynamic column fixed-pattern noise reduction," *IEEE J. Solid-State Circuits*, Vol. 41, pp. 3007-3015, December 2006, which is hereby incorporated by reference in its entirety and for everything it teaches therein. A high quality ramp signal is generated by a similar ramp signal generator in F. Azais, et al. "A low-cost adaptive ramp generator for analog BIST applications," *IEEE Proc. VLSI Test Symp.*, pp. 266-271, May 2001, which is hereby incorporated by reference in its entirety and for everything it teaches therein. The column-wise ADC is designed for 9 bit resolution. The frequency of the column-wise ADC clock ($\Phi_{clk,adc}$) is $512 \times N_r \times f_{frame}$.

Digital Calibration

Figure 12:
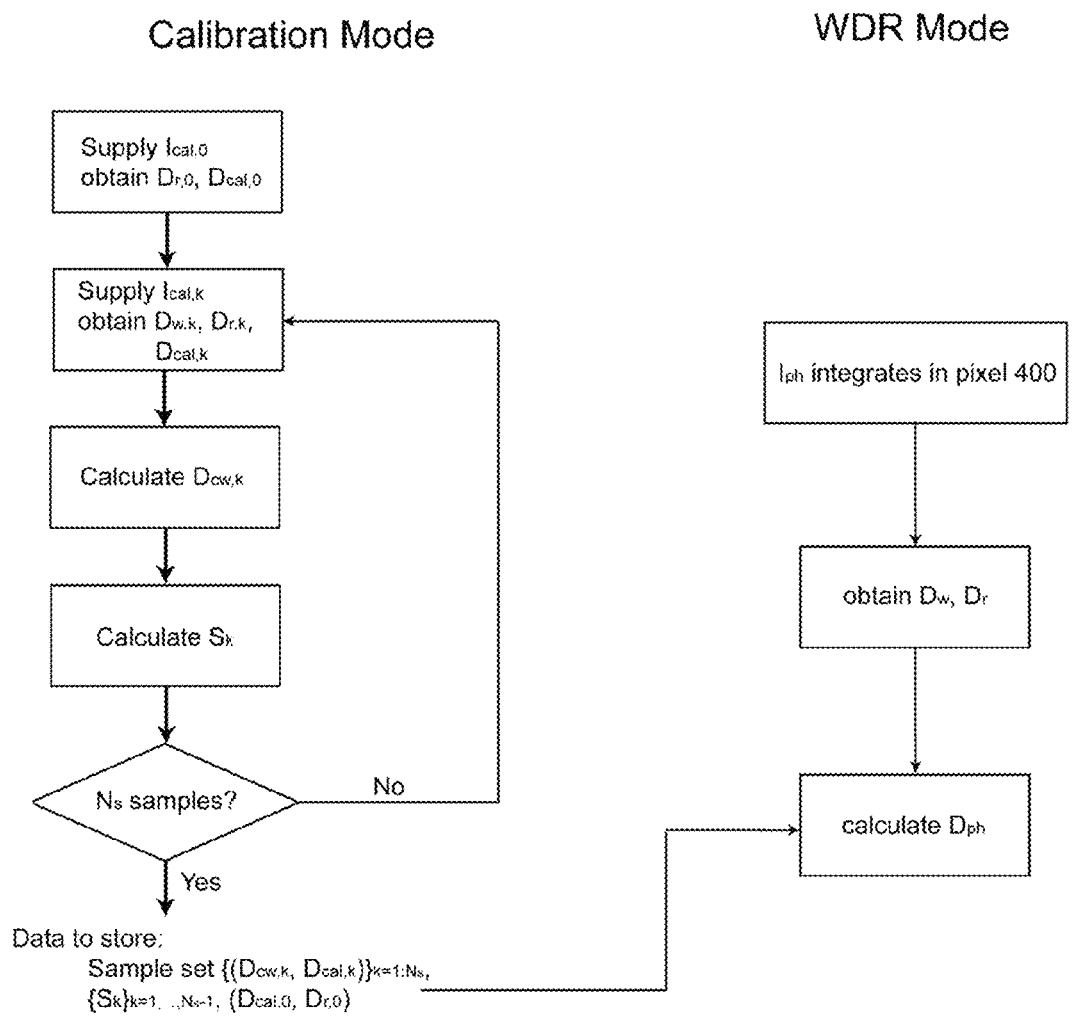
FIG. 12 depicts the flow chart of the interpolation-based calibration method.

According to one embodiment, an interpolation-based method is used to estimate the nonlinear $V_w$ function in FIG. 3, and to compensate for the nonlinearity using a digital decoder. The overall procedure includes two modes. The procedure of the method is plotted in FIG. 12.

In the calibration mode, pixel 400 is connected to the calibration current $I_{cal}$. Different calibration currents $I_{cal}$ are quantized by the pixel, so that the nonlinear function $V_w = f(I_{ph})$ is sampled. The calibration currents are generated by $I_{cal}$ generation circuits 302. Current sources with high output resistance are used in $I_{cal}$ generation circuits 302. The exact $I_{cal}$ values are digitized by a current reference ADC 306 with m+n bit resolution. A dual slope ADC can be used to achieve the high resolution.

At the beginning of the calibration mode, a calibration current $I_{cal,0}$ that does not trigger a pixel self-reset is applied to pixel 400, and is quantized to $(0, D_{r,0})$. Reference ADC 306 quantizes the same current to $D_{cal,0}$. The LSB of the pixel system is digitized by the reference ADC 306 as $$D_{LSB} = \frac{D_{cal,0}}{D_{r,0}}.$$

Then, $N_s$ different calibration currents $I_{cal,k}$ are quantized by both pixel 400 to $(D_{w,k}, D_{r,k})$ and current reference ADC 503 to $D_{cal,k}$. From these digitized values, the digital equivalence $(D_{cw,k})$ of $V_w$ for $I_{cal,k}$ can be calculated as $$D_{cw,k} = \frac{1}{D_{w,k}}(D_{cal,k} - D_{r,k} D_{LSB}).$$

$(D_{cal,k}, D_{cw,k})$ forms a sample of the nonlinear function. Consecutive samples form an interpolation region. The slope of this region is calculated as $$S_k = \frac{D_{cw,k+1} - D_{cw,k}}{D_{cal,k+1} - D_{cal,k}}.$$

Figure 14:
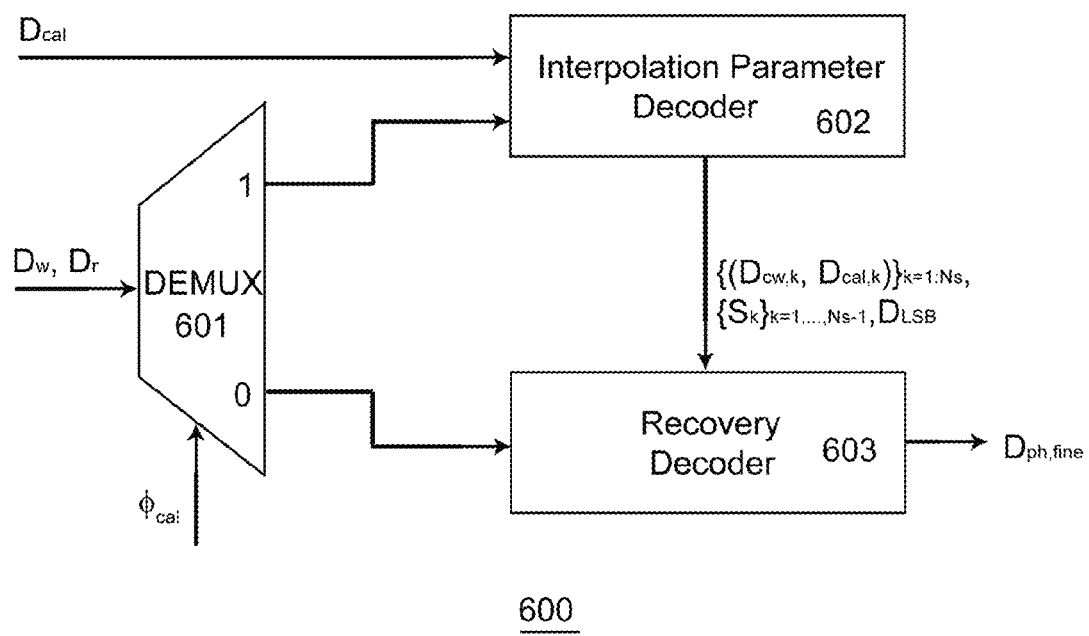
FIG. 14 depicts the structure of the digital decoder 600 for providing digital calibration.
Figure 15:
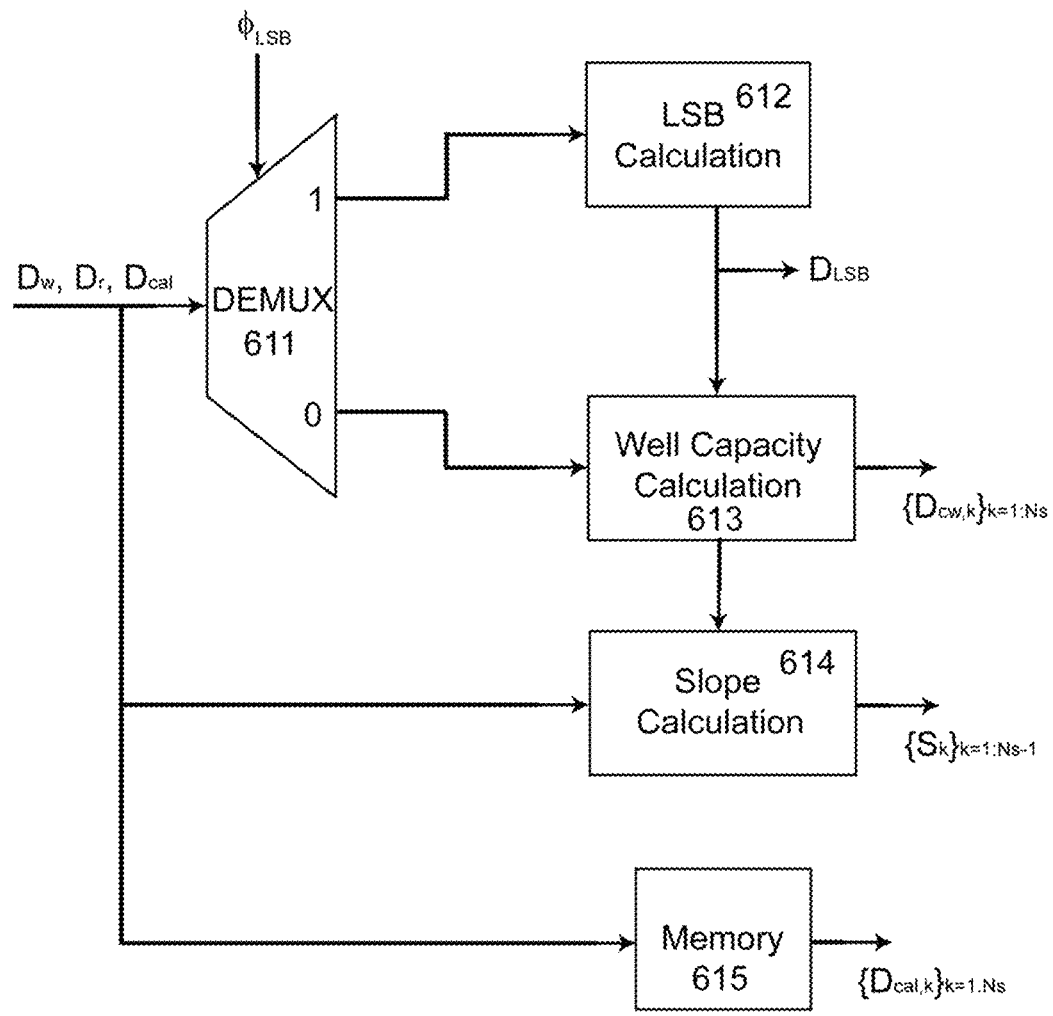
FIG. 15 depicts the structure of the interpolation parameter decoder 602.

The interpolation parameters can be calculated using interpolation parameter decoder 602 shown in FIG. 14 in the calibration mode. The interpolation parameters will be stored in memory to calculate accurate photocurrents in the WDR mode. FIG. 15 describe a schematic diagram of interpolation parameter decoder 602.

Figure 13:
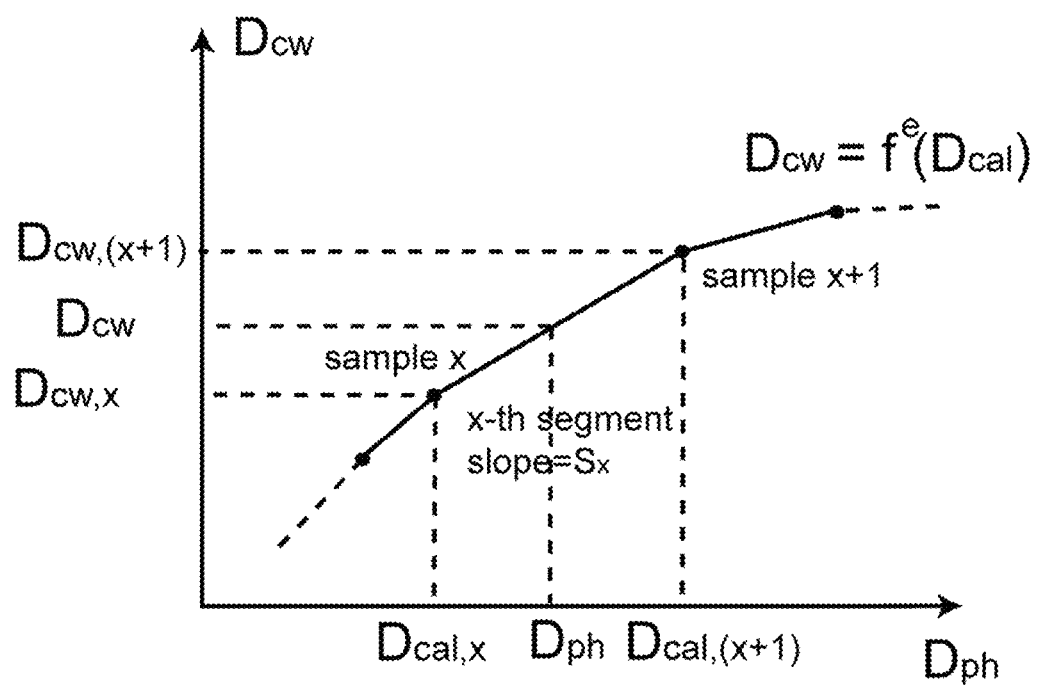
FIG. 13 illustrates the linear interpolation method for calibration.

In the WDR mode, the accurate $V_w$ of a photocurrent can be estimated through linear interpolation as shown in FIG. 13. With digitized values $(D_w, D_r)$, if the photocurrent is found to be in segment x on the curve, the accurate digital photocurrent value can be calculated as $$D_{ph,fine} = \frac{D_w(D_{cw,x} - S_x D_{cal,x}) + D_r D_{LSB}}{1 - S_x D_w}.$$

Figure 17:
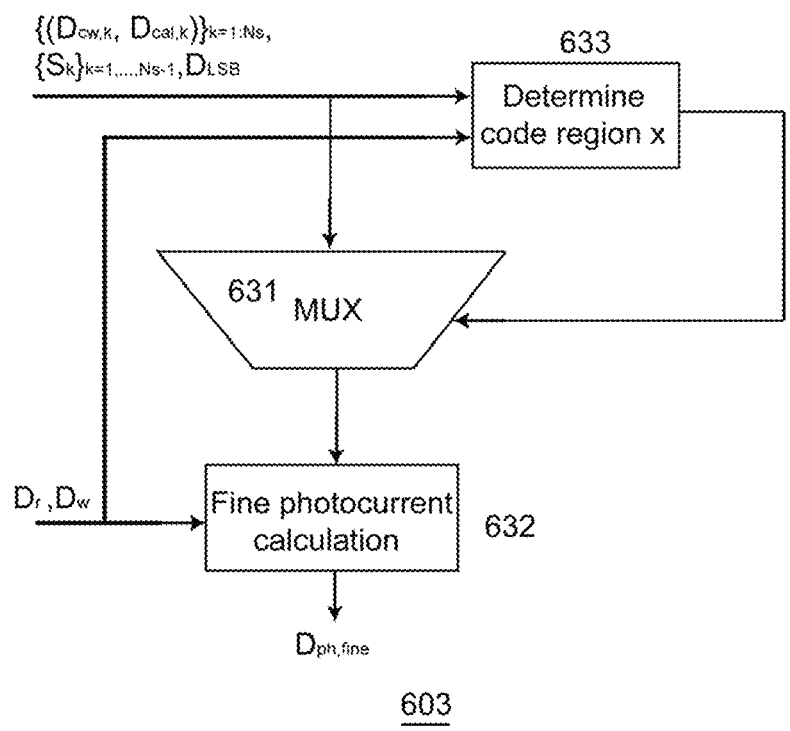
FIG. 17 depicts the structure of the recovery decoder 603.

The calculation can be performed with decoder 603 in FIG. 14. Segment x can be found through iterations. FIG. 17 depicts a schematic diagram of recovery decoder 603.

The calibration and recovery procedures are further described herein with reference to FIGS. 13-18. In the calibration mode, the pixel is configured to sample the nonlinear well capacity $V_w$ with M samples $\{(I_{cal}, V_w)_i\}_{i=1,\ldots,M}$. In the WDR mode, the imaging sensor generates raw image data $(D_w, D_r)$. A DSP estimates the accurate well capacity $V_w$ through linear interpolation from the M samples in real time, and recovers the accurate image from the raw image data.

A. Recovery Procedure

For a photo current $I_{ph}$, the pixel quantizes it into $D_w$ and $D_r$ so that $$I_{ph}=K(D_w V_w + D_r LSB_0) \quad (6)$$

where $K=C_{int}/T_{int}$.

With an approximate $V_{w0}$ applied, a crude $I_{ph0}$ can be calculated. Based on $I_{ph0}$, the interpolation segment region x can be identified as shown in FIG. 13. With interpolation, the accurate $V_w$ can be calculated.

$$V_w = (I_{ph} - I_{cal,x})S_x + V_{w,x} \quad (7)$$

where $S_x$ is the slope in this region. With equations (6) and (7), the accurate photo current can be found as $$I_{ph} = \frac{K(D_w V_{w,x} + D_r LSB_0 - D_w I_{cal,x} S_x)}{1 - K D_w S_x}. \quad (8)$$

The interpolation region x should be verified with this photo current value. If it is in the wrong region, the new region would be used for another iteration. Theoretically, it might take several iterations before the final $I_{ph}$ is found. However, experiments show that no iteration is needed because the pixel nonlinearity generally is small, and the nonlinear function is well-formed.

During the experiment, a digital version of this algorithm is coded in a DSP. The mathematical derivation of this digital algorithm can be found in H. Chan, and J. Yuan, "A Low-Distortion and Wide Dynamic Range CMOS Imager for Wireless Capsule Endoscopy," *International Symp. Circuits and Systems*, pp. 2945-2948, Seattle, USA, May 18-23, 2008, and in J. Yuan, H. Chan, S. Fung, and B. Liu, "Digital calibration technique for highly linear wide dynamic range CMOS imaging sensor," *Electron. Lett.*, Vol. 45, No. 9, pp. 449-451, 2009, where are herein incorporated by reference in their entireties and for everything they teach.

B. Decoder

Figure 16:
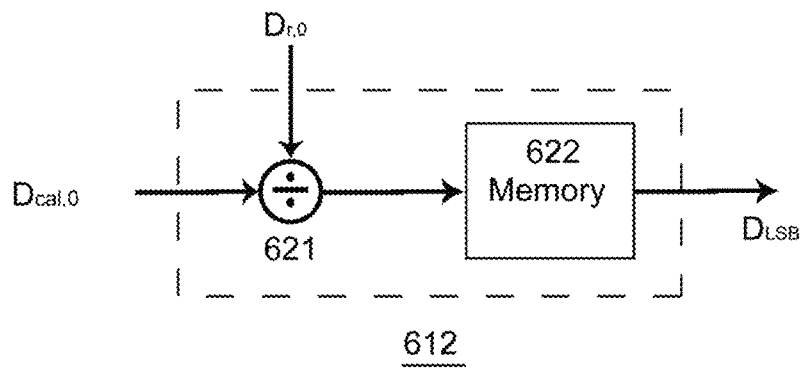
FIG. 16 depicts components of the interpolation parameter decoder 602.
Figure 16:
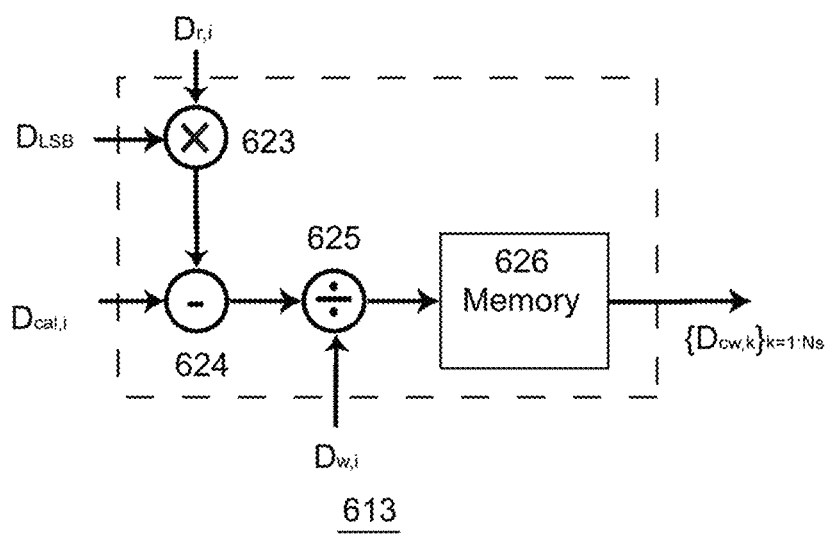
Figure 16:
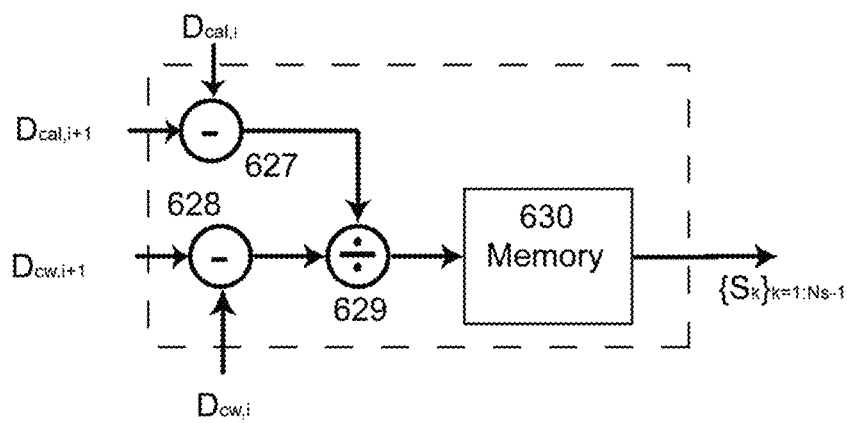
Figure 18:
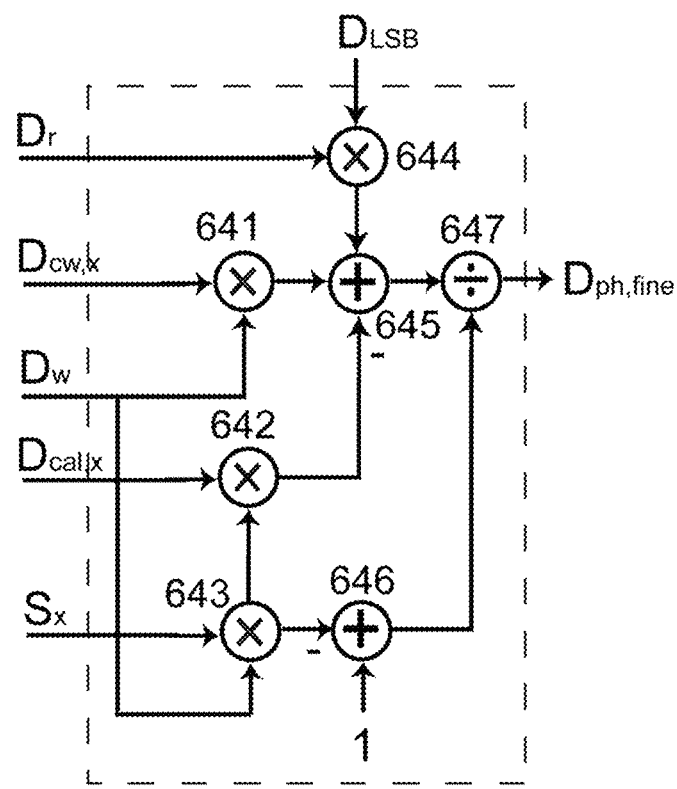
FIG. 18 depicts the structure of the fine photocurrent calculation decoder 632.

The calibration and recovery procedures are implemented by two decoders in the off-chip DSP. FIGS. 16 and 18 shows structures of the decoders. The rectangular boxes 622, 626 and 630 indicate memory elements. Signals outside boxes are inputs or outputs to the DSP.

The decoder shown in FIG. 16 calculates the interpolation parameters in the calibration mode. $D_{cal}$ is the digitized value of $I_{cal}$. The speed of this decoder is not critical. The decoder in FIG. 18 recovers the photo current during the WDR mode. It supports the real-time calculation. As the current ADC quantizes currents into 16 bits, 4M-2 bytes memory is required for each pixel on average. For a 1 K-pixel image sensor, 4M-2 KB memory is needed in the DSP. If all pixels are processed in serial, the decoder needs to run at the rate $f_{frame} \times N_r \times N_c$ Hz, where $N_c$ is the column number. Although 16-bit multipliers are needed in the decoder, only one such decoder is needed in the DSP. If the image size is not large, multiplications can be done in serial as well. Hence, the hardware overhead for digital calibration is low.

Experimental Results

A proof-of-concept 32×32 imaging sensor is fabricated in a 0.35 µm 2P4M CMOS process. The die area is 2.7 mm²×3.5 mm². The imaging chip is illuminated by an integrating sphere US-120-SF (Labsphere, Inc.), with the light source Fiber-Lite PL900 (Dolan Jenner Industries). The optical power meter is S-120 (Thorlabs). The output data from the imaging chip is captured by a logic analyzer 16902B (Agilent), and is further processed by a computer.

A. Optical and Electrical Parameters

Figure 19:
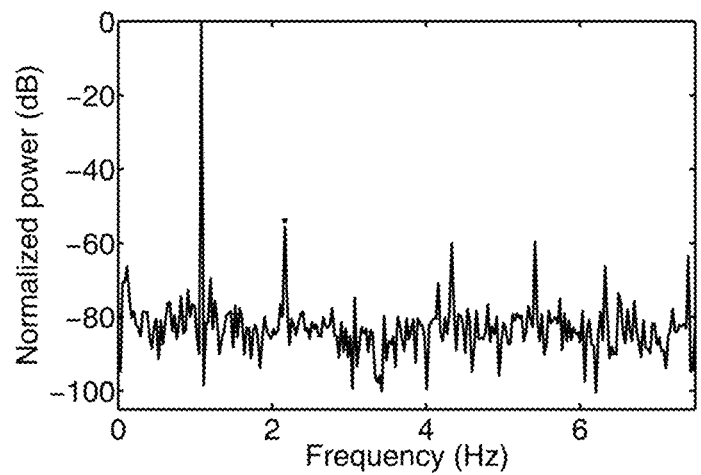
FIG. 19 illustrates the spectrum of the fabricated column-wise ADC with $f_{frame}=15$ Hz.

The column-wise ADC is measured. A sinusoidal signal is applied to one column-wise ADC. A spectrum analyzer (SR760, Stanford Research Systems) shows that the input spurious-free dynamic range (SFDR) is about 83 dB. 512-pt FFT testing routine is performed on the ADC at 15 Hz frame rate. The spectrum is shown in FIG. 19. The overall signal-to-noise-distortion ratio (SINAD) is 50.9 dB. The SFDR is 53.7 dB. The effective number of bit (ENOB) is 8.2 bits. The ADC LSB size is 5.9 mV.

The pixel capacitance is measured to be 12 fF by the on-chip current ADC. The sensitivity of the imaging sensor is 13.3 µV/e⁻. With the optical meter, the responsivity of the imaging sensor is measured to be 0.38 A/W at the wavelength of 555 nm. The dark current of a pixel is 0.96 fA at room temperature, which corresponds to a dark current density of 0.56 nA/cm².

B. Difference Mode

The imaging sensor starts in the difference mode, and switches to the WDR mode when the difference image pixel value reaches a threshold. Various digital thresholds are set within the potential well. The imaging chip is able to switch to the WDR mode correctly if the scene changes significantly.

C. Linearity

Figure 20:
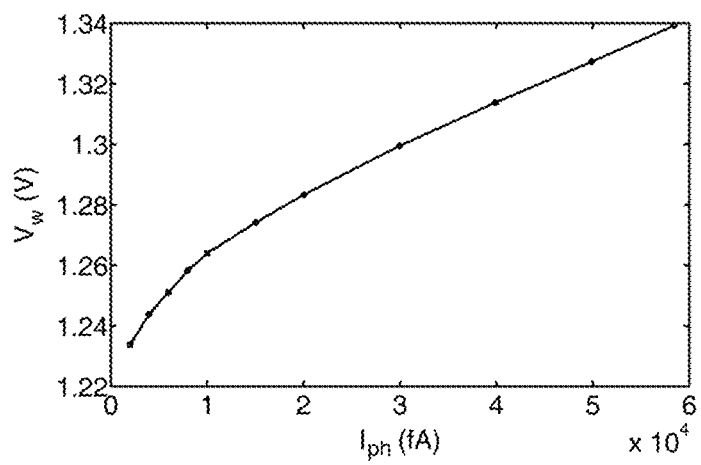
FIG. 20 illustrates the sampled well size of one pixel.

With the current ADC, the calibration procedure is performed on pixels of the imaging sensor. $V_w$ of one pixel is sampled by 11 $I_{cal}$ currents, and is shown in FIG. 20. The digitized photo current $I_{ph}$ and $V_w$ have been converted to their analog values with the ADC LSB sizes. The nonlinearity is strong, particularly at the low current end.

Figure 21:
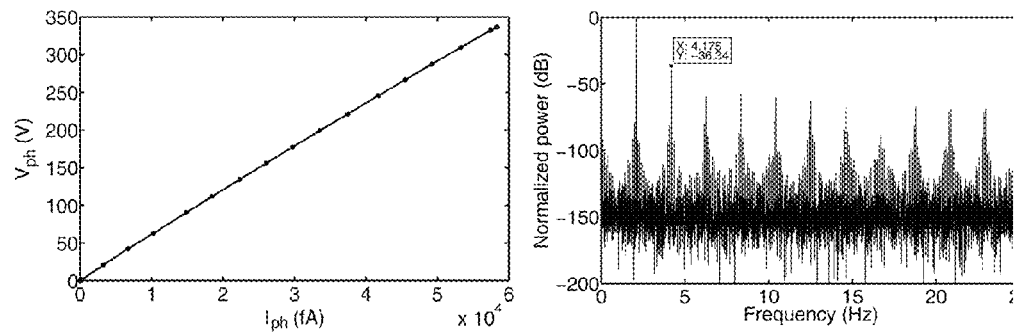
FIG. 21 illustrates the pixel linearity before calibration.
Figure 22:
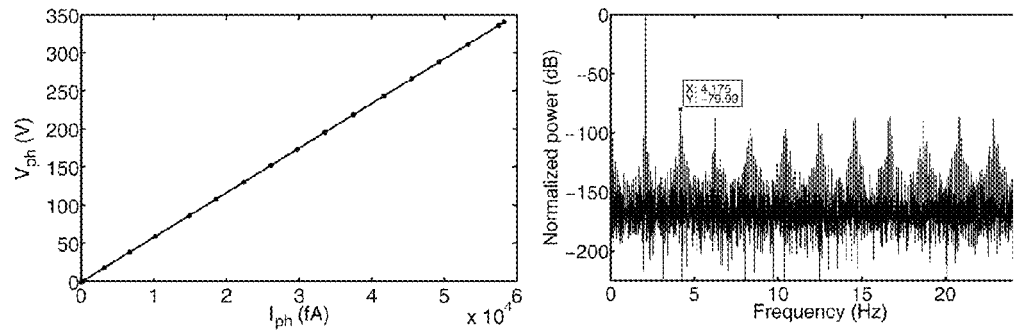
FIG. 22 illustrates the pixel linearity after calibration.

The pixel linearity is measured by 17 currents. Without calibration, a uniform $V_w$ is used to estimate the accumulated photo voltage $V_{ph}$. The estimated photo voltages are shown in FIG. 21, with a spectrum simulated from this line. The harmonic distortion is −36.4 dB. The sampled nonlinear function is used to recover the accurate photo voltages. The recovered photo voltages after calibration are shown in FIG. 22, with a spectrum simulated from this line. The harmonic distortion is improved to −75.6 dB.

The linearity in FIG. 22 is tested in the electrical domain, which includes only the circuits. Linearity test in the optical domain can not be performed with the existing equipment because it requires an optical source with better than 14-bit linearity. Nonetheless, the difference between the two measurements is only the photo-diode.

D. FPN, Temporal Noise and DR

The imaging sensor is uniformly illuminated by the integrating sphere. Before calibration, the measured FPN of images is 5.1%. The FPN is mainly due to the mismatch of pixel-level circuits. After calibration, the overall measured FPN is 1.0%. FPN of the processing and read-out circuits is measured by applying a current into all the pixels, and comparing the recovered $V_{ph}$ after calibration. The uniformity among pixel circuits after calibration is better than 12-bit.

Therefore, the measured FPN is dominated by the photo diode variation and the optical equipment.

The temporal noise of the imaging sensor is dominated by the ADC quantization noise at low illumination level. Therefore, the pixel analog output is measured for noise instead. At a low illumination level which does not trigger overflow, the measured temporal noise of one pixel is 3.1 m $V_{rms}$. The accumulated photo voltage is 1.287V. The SNR is 47.4 dB. At a high illumination level, the measured pixel temporal noise is 37.4 mV. The accumulated photo voltage is 330.6V. The SNR is 73.9 dB. The photo current ratio of the two illumination levels is about 256, while the SNR improvement is 26.5 dB. The SNR improves 3.3 dB per signal doubling, which agrees with the temporal noise analysis well.

At 15 Hz frame rate, the maximum photo current that the partial quantization scheme can process is 58.4 pA. The minimum detectable photo current is limited by the ADC LSB. The dynamic range of the imaging sensor is about 95.3 dB.

The measured performance of the designed imaging sensor is listed in Table I.

TABLE I

PERFORMANCE SUMMARY OF THE DESIGNED IMAGING SENSOR

| | Performance | |
|---|---|---|
| Process | 0.35um 2P4M N-Well CMOS | |
| Supply Voltage | 3.3 V | |
| Pixel Size | 25 µm × 25 µm | |
| Fill Factor | 27%, 33%(without sampler) | |
| Frame Rate | up to 15 Hz | |
| Dark Current | 0.56 nA/cm$^2$ | |
| Sensitivity | 13.3 V/e$^-$ | |
| Responsivity | 0.38 A/W | |
| Dynamic Range | 95.3 dB | |
| Maximal SNR | 74.5 dB | |
| | Before cal. | After cal. |
| Linearity | −36.4 dB | −75.6 dB |
| FPN | 5.1% | 1.0% |
| Power Consumption | 316 µW @ 15 Hz | |

The measured power only includes the analog and digital power of the imaging sensor. The imaging sensor requires a digital back-end for calibration, which will burn more digital power. This extra digital power is not important for imaging systems with static power supply. The WDR linear imaging sensor can also be used in power-limited implantable bio-medical sensors, such as capsule endoscopy. In these applications, only the imaging sensor is implanted. The raw image data is transmitted to an external receiver through a wireless link. The digital calibration back-end is included in the receiver. The external receiver is usually not sensitive to the extra digital power, while the implanted capsule's data transmission power is considerably reduced due to lower data rate from the imaging sensor with the activity detection feature.

The design of a new activity-triggered wide dynamic range highly linear CMOS imaging sensor is introduced. The image sensor has three operation modes including difference mode, wide dynamic range (WDR) mode, and calibration mode. The imaging sensor normally runs in the difference mode. It switches to capture WDR images if the activity in the scene is intense.

The co-existence of the two modes is enabled by the new pixel design. A low charge injection current sampler is included in the pixel for the difference mode. A partial quantization scheme is developed to linearly expand the DR of the imaging sensor with an in-pixel comparator. The nonlinear potential well size is compensated by a digital calibration scheme. The decoder cost of the pixel-level calibration scheme is low. A new out-of-pixel counter scheme is designed to separate the digital circuits from the analog pixel.

One embodiment of the CMOS image sensor includes a 32×32 pixel array manufactured in a 0.35 µm CMOS process. The pixel in the image sensor has a high fill factor of 27%. Without the current sampler, the fill factor is 33%. The fabricated imaging sensor capture images up to 15 Hz with 95.3 dB dynamic range. After the digital calibration, the pixel distortion is as low as −75.6 dB over the whole dynamic range. The fixed-pattern noise of the designed imaging sensor is dominated by the photo-diode variation. The maximum SNR of the fabricated imaging sensor is 74.5 dB. The new CMOS imaging sensor design with its wide dynamic range and high linearity can be used in high-performance scientific and bio-medical imaging applications.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:
1. An imaging apparatus, comprising:
a pixel array including a plurality of pixel circuits, wherein the pixel array has different modes, the different modes including a calibration mode and a wide dynamic range, and wherein each pixel circuit includes:
a photodiode;

a comparator for comparing a node voltage with a reference voltage, wherein the photodiode is reset when the node voltage is below the threshold voltage; and a counter configured to record a number of times that the photodiode is reset;

a control circuit for generating control signals for switching the pixel array among the different modes;

a calibration parameter decoder for storing calibration data generated during the calibration mode;

a recovery decoder for incorporating the calibration data into a recovered image; and at least one processor for generating output signals in accordance with pixel signals;

wherein the calibration and wide dynamic range modes are mutually exclusive in time.

2. The imaging apparatus of claim 1, wherein the plurality of pixel circuits are arranged in one or more columns, the imaging apparatus further comprising:

one or more processing circuits, each associated with one of the one or more columns for generating column data from the pixel signals collected from the pixel array.

3. The imaging apparatus of claim 1, wherein the plurality of pixel circuits are arranged in one or more columns and the pixel signals include digital and analog pixel signals, and each of the one or more columns further comprises:

a digital column bus for reading the digital pixel signals from an associated column;

an analog column bus for reading the analog pixel signals from an associated column; and a column processing circuit for processing the digital and analog pixel signals, each column processing circuit further comprising:

an analog-to-digital converter for converting the analog pixel signals to digital codes; and a column counter for counting the digital pixel signals.

4. The imaging apparatus of claim 3, wherein the columns are configured to collect a plurality of sample data sets for each pixel from the pixel array operating in the calibration mode;

wherein the calibration decoder is further configured for generating calibration parameters from the plurality of sample data sets collected during the calibration mode, wherein the calibration parameters includes a set of sampled currents with their accurate well capacity; and wherein incorporating the calibration data into a recovered image by the recovery decoder includes generating a recovered photo current from the calibration parameters, the digital pixel signals, and the analog pixel signals during the wide dynamic range mode.

5. The imaging apparatus of claim 3, wherein m is indicative of an integer and the column counter comprises:

an m-bit cell array for storing a self-reset number of each pixel;

an m-bit adder for summing the digital pixel signals and output values from the m-bit cell array;

an m-bit register for latching the summed value from the m-bit adder at a falling edge of a counter clock;

m inverters coupled to the m-bit register;

a first BIT bus coupled to a terminal of every cell of the m-bit cell array, including m bit lines;

a second BIT bus coupled to another terminal of every cell of the m-bit cell array including m bit lines;

a number of m identical switches coupled between said register and said BIT bus by control of a column write signal;

m identical switches coupled between the inverters and the second BIT bus and controlled by a column write signal; and m identical switches coupled between the first and second BIT buses and controlled by an equalization signal.

6. The imaging apparatus of claim 5, wherein the m-bit cell array comprises m identical cells, and each cell comprises:

first and second cross-coupled inverters forming first and second internal nodes respectively;

a first cell switch coupled between the first internal node and a bit line in the first BIT bus and controlled by an SRAM signal; and a second cell switch coupled between the second internal node and a bit line in the second BIT bus and controlled by the SRAM signal.

7. The imaging apparatus of claim 1, wherein the calibration parameter decoder is further configured for generating calibration parameters in the calibration mode; and wherein incorporating the calibration data into a recovered image by the recovery decoder includes receiving raw quantized data and the calibration parameters for calculating accurate digitized photocurrent in accordance with an interpolation method in the wide dynamic range mode.

8. The imaging apparatus of claim 1, wherein the imaging apparatus is configured to generate self-resets in the wide dynamic range mode so as to expand the dynamic range of the imaging apparatus.

9. An imaging apparatus comprising:

pixel array including a plurality of pixel circuits, wherein the pixel array has different modes the different modes including a calibration mode and a wide dynamic range, and wherein each pixel circuit includes:

a photodiode a comparator for comparing a node voltage with a reference voltage, wherein the photodiode is reset when the node voltage is below the threshold voltage; and a counter configured to record a number of times that the photodiode is reset;

a control circuit for generating control signals for switching the pixel array among the different modes;

a calibration parameter decoder configured to measure and calculate well capacities for calibration currents during calibration;

a recovery decoder configured to calculate the well capacity for a photocurrent from interpolation in the wide dynamic range mode; and at least one processor for generating output signals in accordance with pixel signals;

wherein the calibration and wide dynamic range modes are mutually exclusive in time and wherein the imaging apparatus is configured to generate self-resets in the wide dynamic range mode so as to expand the dynamic range of the imaging apparatus.

10. An imaging apparatus, comprising:

a pixel array including a plurality of pixel circuits, wherein the plurality of pixel circuits are arranged in one or more columns wherein the pixel array has different modes the different modes including a calibration mode and a wide dynamic range, and wherein each pixel circuit includes:

a photodiode;

a comparator for comparing a node voltage with a reference voltage, wherein the photodiode is reset when the node voltage is below the threshold voltage;

a counter configured to record a number of times that the photodiode is reset and two cascode transistors configured to separate a column bus capacitance from an internal integration capacitance of the pixel circuit;

one or more processing circuits, each associated with one of the one or more columns for generating column data from the pixel signals collected from the pixel array;

a control circuit for generating control signals for switching the pixel array among the different modes; and at least one processor for generating output signals in accordance with pixel signals;

wherein the calibration and wide dynamic range modes are mutually exclusive in time.

* * * * *